(12) United States Patent
Baranski

(10) Patent No.: US 8,077,100 B2
(45) Date of Patent: Dec. 13, 2011

(54) ANTENNA CONNECTOR

(75) Inventor: Detlef Baranski, Recklinghausen (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 385 days.

(21) Appl. No.: 12/514,748

(22) PCT Filed: Nov. 2, 2007

(86) PCT No.: PCT/EP2007/061839
§ 371 (c)(1),
(2), (4) Date: May 13, 2009

(87) PCT Pub. No.: WO2008/058855
PCT Pub. Date: May 22, 2008

(65) Prior Publication Data
US 2010/0085261 A1 Apr. 8, 2010

(30) Foreign Application Priority Data

| Nov. 15, 2006 | (GB) | 0622786.2 |
| Nov. 15, 2006 | (GB) | 0622787.0 |
| Jan. 10, 2007 | (GB) | 0700434.4 |
| Jul. 6, 2007 | (GB) | 0713137.8 |

(51) Int. Cl.
*H01Q 1/32* (2006.01)
(52) U.S. Cl. .......................... 343/713; 343/711; 343/712
(58) Field of Classification Search .................. 343/711, 343/712, 713
See application file for complete search history.

(56) References Cited

U.S. PATENT DOCUMENTS

| 4,003,056 A | 1/1977 | Davis |
| 4,992,800 A | 2/1991 | Parfitt |

(Continued)

FOREIGN PATENT DOCUMENTS

DE 44 24 833 A1 1/1996

(Continued)

OTHER PUBLICATIONS

Form PCT/ISA/210 (International Search Report) dated Mar. 21, 2008.

(Continued)

*Primary Examiner* — Dieu H Duong
(74) *Attorney, Agent, or Firm* — Buchanan Ingersoll & Rooney PC

(57) ABSTRACT

An automotive glazing, comprising an antenna connector is disclosed. The glazing comprises at least a first ply of a transparent glazing material, and a ply of a plastics material extending across the ply of glazing material and having a line-like electrical conductor in contact therewith, a portion of the electrical conductor line being configured to form an antenna conductor and a portion being configured to form a coupling region. In addition, a surface contact is provided on the surface of the first ply of glazing material situated away from the plastics material, in registration with the coupling region. The coupling region and the surface contact form a transmission line acting as a bandpass filter for a frequency band f, the portion of the electrical conductor forming the coupling region having a length approximately equal to an odd multiple of a quarter of a first effective wavelength $\lambda_{eff}$ in the glazing corresponding to f. Signals received by the antenna in the bandwidth are transferred between the coupling region and the surface contact by low-impedance radio frequency coupling. Preferably, the surface contact and the coupling region form a two-line transmission line.

31 Claims, 16 Drawing Sheets

U.S. PATENT DOCUMENTS

| | | | |
|---|---|---|---|
| 5,105,201 A | 4/1992 | Nakase et al. | |
| 5,231,408 A | 7/1993 | Nakase | |
| 5,528,113 A | 6/1996 | Boys et al. | |
| 5,534,879 A | 7/1996 | Braun et al. | |
| 5,781,160 A | 7/1998 | Walton | |
| 5,999,136 A * | 12/1999 | Winter et al. | 343/713 |
| 6,285,331 B1 * | 9/2001 | Jesman et al. | 343/713 |
| 6,320,276 B1 | 11/2001 | Sauer | |
| 6,344,828 B1 | 2/2002 | Grantz et al. | |
| 6,384,790 B2 * | 5/2002 | Dishart et al. | 343/713 |
| 2001/0013841 A1 | 8/2001 | Dishart et al. | |
| 2002/0189329 A1 | 12/2002 | Wimmer | |
| 2005/0146830 A1 | 7/2005 | Green et al. | |
| 2006/0273966 A1 | 12/2006 | Maeuser | |

FOREIGN PATENT DOCUMENTS

| | | |
|---|---|---|
| DE | 203 17 060 U1 | 3/2004 |
| DE | 103 19 606 A1 | 11/2004 |
| DE | 10 2005 006 861 A1 | 8/2006 |
| DE | 10 2005 006 862 A1 | 8/2006 |
| DE | 10 2005 022 909 A1 | 11/2006 |
| DE | 10 2005 022 913 A1 | 11/2006 |
| DE | 10 2005 022 980 A1 | 11/2006 |
| EP | 0 608 554 A1 | 8/1994 |
| EP | 0 744 785 A1 | 11/1996 |
| EP | 0 849 823 A1 | 6/1998 |
| EP | 1 014 476 A1 | 6/2000 |
| EP | 1 256 261 A1 | 11/2002 |
| EP | 1 612 568 A1 | 1/2006 |
| GB | 2 172 148 A | 9/1986 |
| WO | WO 99/66588 A1 | 12/1999 |
| WO | WO 00/05824 A2 | 2/2000 |
| WO | WO 01/56334 A1 | 8/2001 |

OTHER PUBLICATIONS

Search Report issued in GB0622786.2, Apr. 12, 2007, UK Intellectual Property Office, UK.

U.S. Appl. No. 12/514,733, filed May 13, 2009, Paulus, et al.

\* cited by examiner

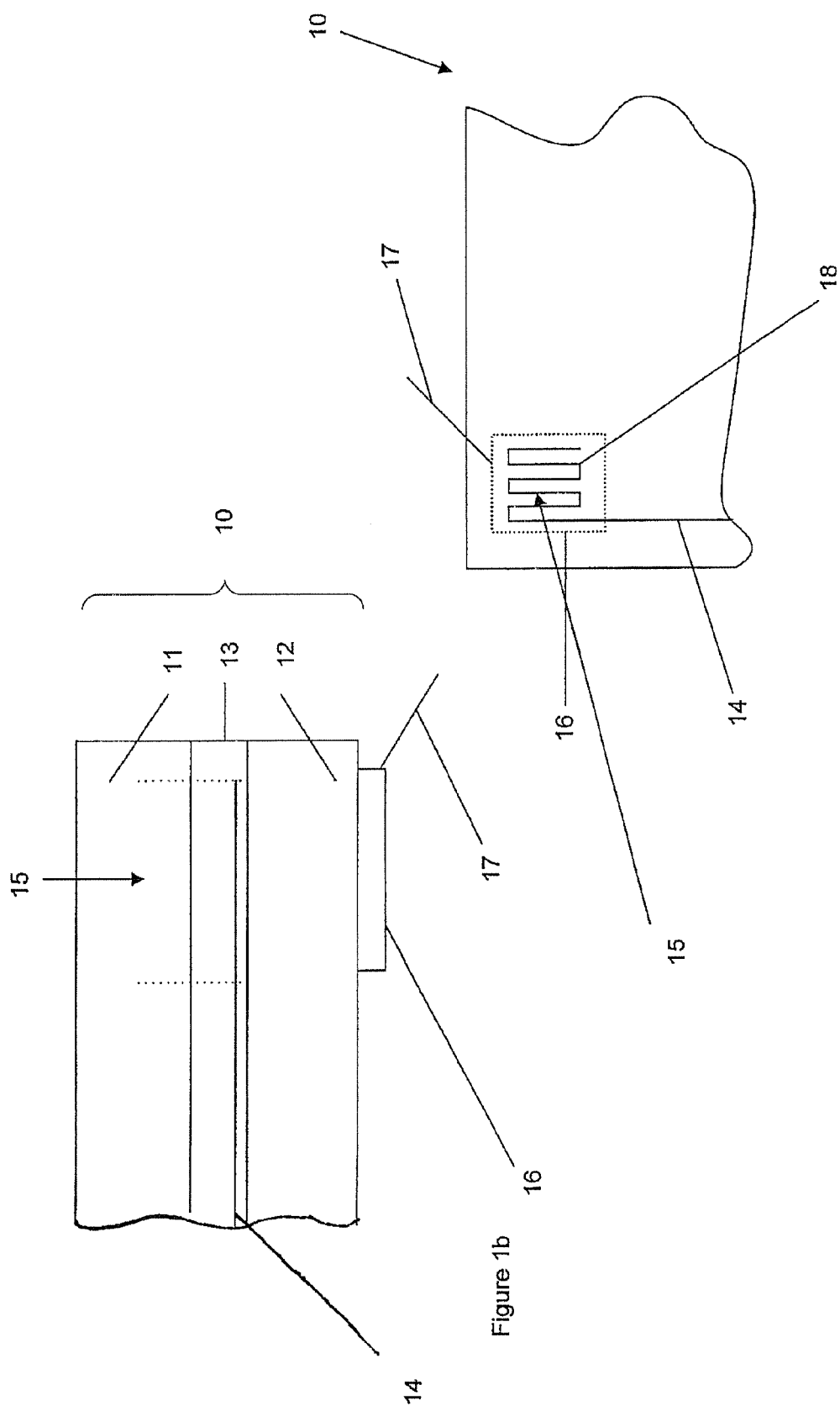

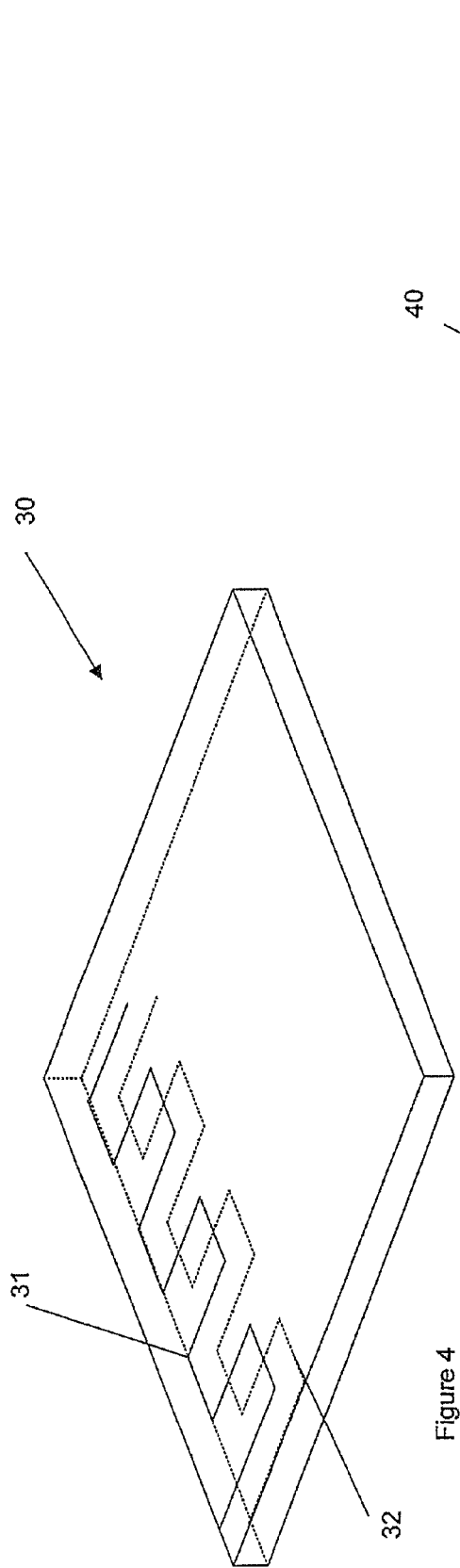
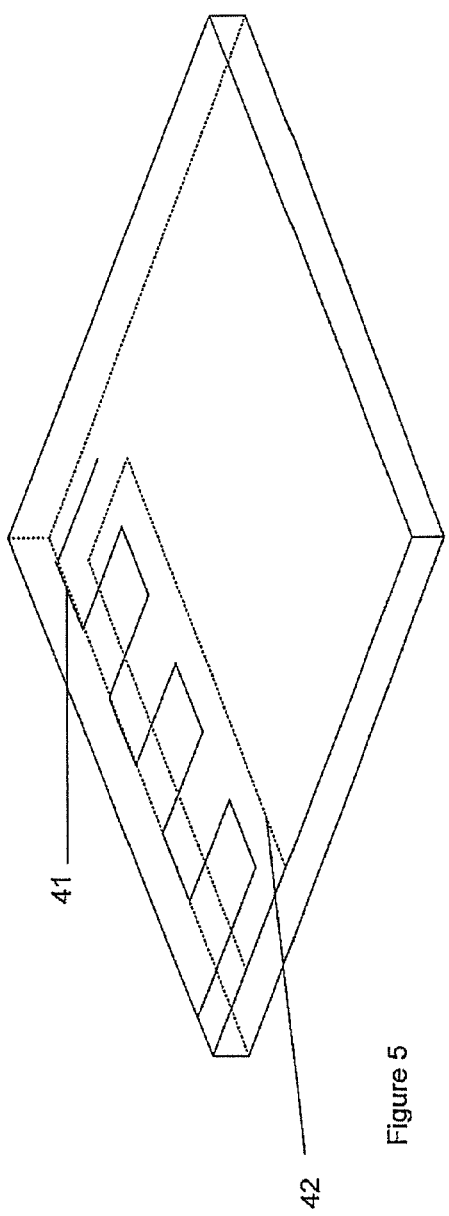
Figure 4
Figure 5

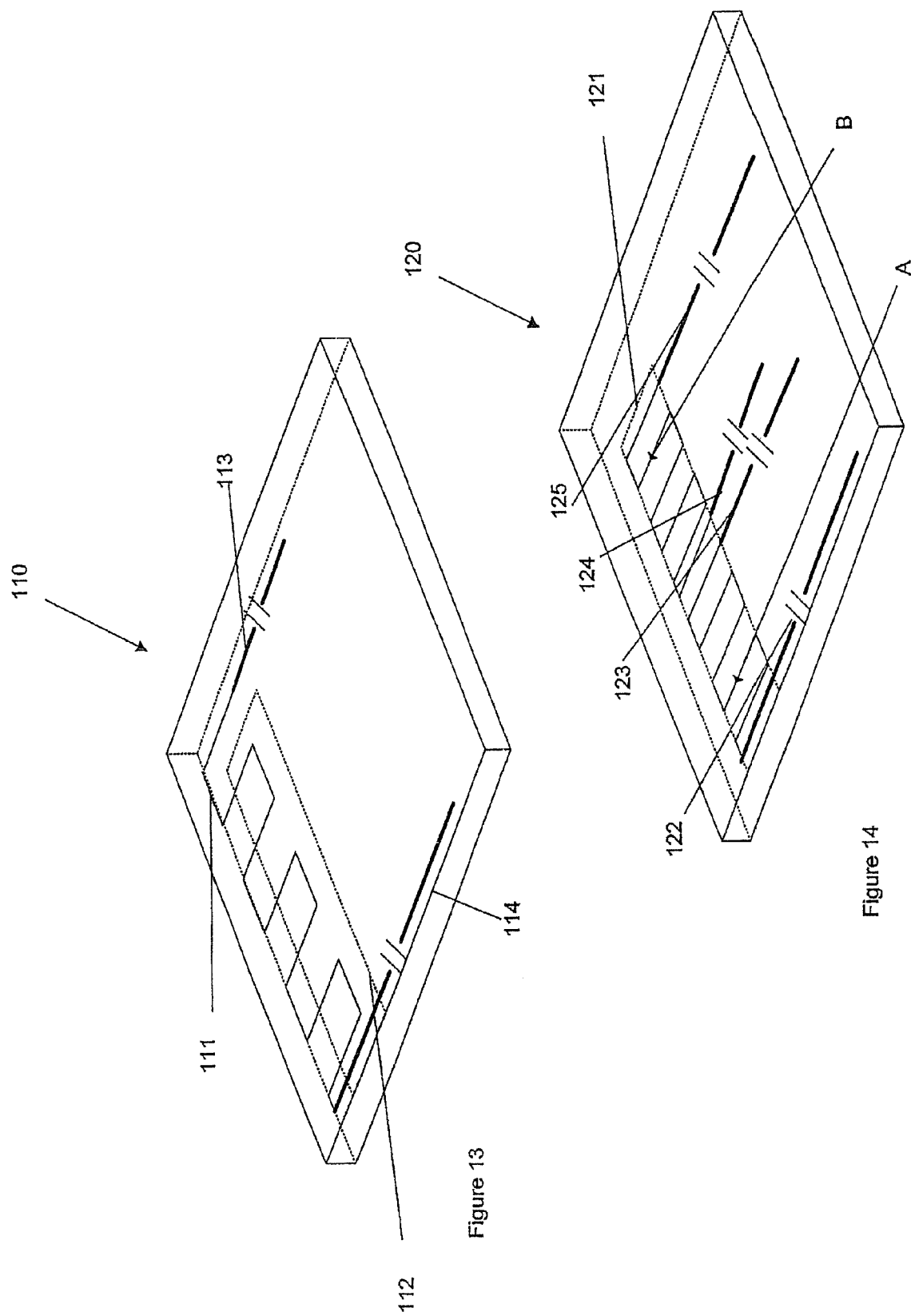

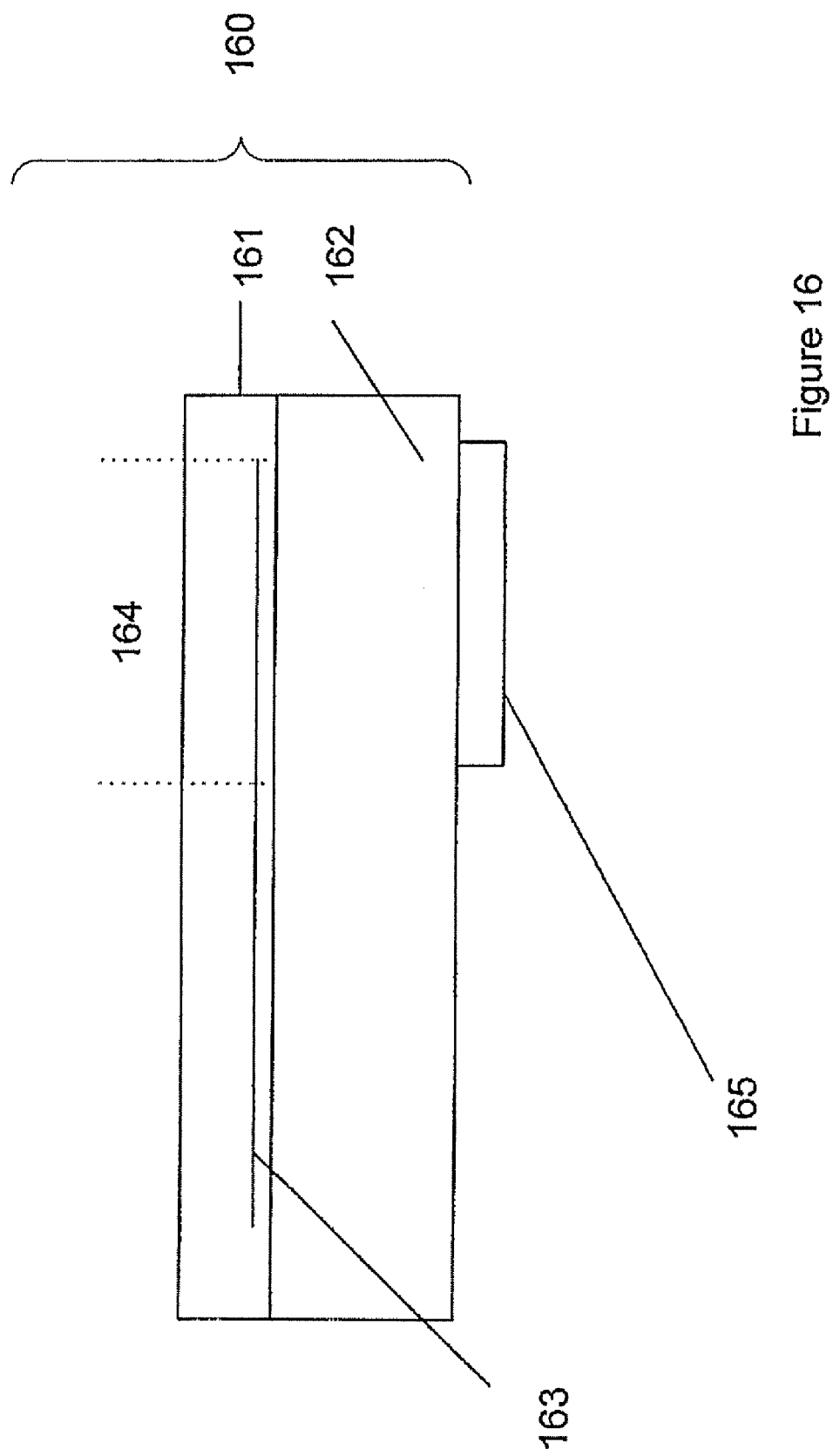

ANTENNA CONNECTOR

The present invention relates to antennae on automotive glazings, in particular the electrical coupling of such antennae to external wiring circuits.

Traditionally, antennae have been included on automotive vehicles as a removable or telescoping rod, attached to the bodywork of the vehicle, which is able to pick up both AM and FM transmissions. More recently, the trend has been to include the antenna within a laminated front glazing or backlight of the vehicle. In the case of laminated glazings, which comprise two plies of glass having a layer of interlayer material, such as PVB (poly vinyl butyral) laminated therebetween, the antenna may be provided by screen printing a conductive silver-based ink onto a surface of the plies of glass forming the glazing. Alternatively, the antenna may be provided by laying fine wires onto one of the surfaces of the interlayer material and applying heat, such that the wires become adhered to the interlayer and embedded therein.

Where an antenna is provided within a laminated glazing, either by printing or by wiring, it is necessary to make a connection between the antenna, internal to the glazing, and the wiring harness of the vehicle in which the glazing is installed. For wire antennae, this may be done using a galvanic flat cable connector. A connector, such as a flat cable connector, is soldered to an end of the antenna wire on the interlayer, such that the ends of the cables are within the glazing structure when laminated. The outer portion of the connector then overhangs the edge of the finished glazing, ready for connection in the vehicle. However, there are disadvantages to the use of such a connection. During lamination, it is necessary to de-air the glass/interlayer assembly before autoclaving, which is typically done by passing the assembly through a pair of fixed or articulated nip rollers. When a flat cable connector has been soldered into place, it is not possible to de-air the glazing using nip rollers. Instead, the use of complex vacuum ring equipment is necessary, where the glass/interlayer/glass assembly is de-aired by drawing out air through a rubber ring sealed about the edge of the assembly.

As an alternative to using flat cable connectors, small, flat galvanic connectors may be included within the laminated structure, in a cut-out at the edge of the glazing, and external wiring fixed with extra plugs and receptacles to these connectors. Although relatively expensive, this solution does at least allow the glass/interlayer/glass assembly to be de-aired using nip rollers, thus reducing production costs. However, the presence of the connectors at the edge of the glazing may lead to localised delamination and cracking of the plies of glass when the glazing is in use.

In addition, both of these connection solutions involve soldering a connector to the antenna on the surface of one of the plies of glass. When using lead containing solders, sufficient adhesion between the connector, the contact and the glass is achieved with a relatively low stress within the surface of the glass. However, environmental concerns have produced a growing need within the automotive industry to be able to use lead-free solders for electronic applications on glazings. One disadvantage of using lead free solders is that the level of adhesion provided is lower, such that on occasion, it is desirable to use both a solder and an adhesive when making electrical connections, such as in EP 1 256 261B1. In addition, the stress at the surface of the glass may be increased when a lead-free solder is used alone, in comparison with a lead-containing solder.

As an alternative to using galvanic connectors, it is known to use capacitively coupling connectors. Rather than relying on a physical, soldered contact between the connector and the antenna wire within the glazing, as with a galvanic connector, connection takes place by capacitive coupling between superposed coupling plates. A copper plate is soldered to the antenna wire on the surface of the interlayer, which is then placed between the two plies of glass. The antenna wire and copper plate may be adjacent the inner surface of the outer ply of glass, ("surface 2") or the outer surface of the inner ply of glass ("surface 3"), each facing the interlayer. A connector capable of coupling capacitively with the copper plate is mounted on the inner surface of the inner ply of glass ("surface 4"; that which faces into the vehicle when fitted). (Surface 1 is the outer surface of the glazing.) Typically, such connectors are the lower half (male) of a metal press-stud connector having a plastic housing which is adhered to the inner surface of the inner ply of glass. The connection to the wiring harness of the vehicle is made using the upper (female) half of the press-stud when the glazing is fitted into the vehicle. Whilst this approach is more reliable and easier to process than using galvanic connectors, difficulties arise in its use with AM antenna connections, which require large area coupling plates to ensure a low-impedance radio-frequency connection to receive low frequency transmissions. Soldering a copper plate or the like to the antenna conductor also adds complexity to the manufacturing process.

An alternative approach is taken in WO99/66588A1. This document proposes the use of a conductive patch area to form a capacitive connection with an on-glass antenna. The patch area may be formed either from a transparent electroconductive coating, or from an opaque conductive ceramic IR, UV, thermost or thermoplastic paint. If an opaque material is used, the patch area is farmed in a grid pattern to increase visibility through the glazing in the connector region.

It is desirable to find an improved method of connecting antenna circuits within laminated glazings to external wiring, having a lower risk of delamination, without the need to use solder, and being suitable for use with widely available processing equipment and all established antenna types.

The present invention aims to address these problems by providing an automotive glazing, comprising at least a first ply of a transparent glazing material; a ply of a plastics material extending across the ply of glazing material and having a line-like electrical conductor in contact therewith, a portion of the electrical conductor line being configured to form an antenna conductor and a portion being configured to faun a coupling region; a surface contact on the surface of the first ply of glazing material situated away from the plastics material, in registration with the coupling region; wherein the coupling region and the surface contact form a transmission line acting as a bandpass filter for a frequency band f, the portion of the electrical conductor forming the coupling region having a length approximately equal to an odd multiple of a quarter of a first effective wavelength $\lambda_{\mathit{eff}}$ in the glazing corresponding to f, such that signals received by the antenna in the bandwidth are transferred between the coupling region and the surface contact by low-impedance radio frequency coupling.

By forming a coupling region from the wire itself, signals may be coupled from the antenna conductor to the surface contact without the need to use traditional galvanic contacts where a physical connection is needed. The risk of delamination and glass cracking is therefore reduced, and production methods are simplified, leading to reduced cost. In addition, the connector may be used as a bandpass filter for the received signal, filtering out undesirable frequencies.

In addition, the present invention also provides an automotive glazing, comprising a ply of a transparent glazing material having a line-like electrical conductor in contact therewith; a portion of the line-like electrical conductor being configured to form an antenna conductor and a portion being configured to form a coupling region; a ply of a plastics material extending across at least a portion of the ply of glazing material; a surface contact on the surface of the plastics material, in registration with the coupling region; wherein the coupling region and the surface contact form a transmission line acting as a bandpass filter for a frequency band f, the portion of the electrical conductor forming the coupling region having a length approximately equal to an odd multiple of a quarter of a first effective wavelength $\lambda_{\text{eff}}$ in the glazing corresponding to f, such that signals received by the antenna in the bandwidth are transferred between the coupling region and the surface contact by low-impedance radio frequency coupling.

This provides the same advantages, but for use with single-ply or bi-layer glazings.

Preferably, the portion of the electrical conductor forming the coupling region is configured such that adjacent conductor turns have parallel electric currents.

Preferably, the portion of the electrical conductor forming the coupling region has at least one reticulation.

More preferably, the portion of the electrical conductor forming the coupling region is formed into a spiral having at least one turn.

Preferably the length of the portion of the electrical conductor forming the coupling region, the number of reticulations or turns and the spacing between reticulations or turns are determined by f. Preferably, the spacing between the reticulations or turns is greater than the distance at which electrical current cancelling effects occur.

Preferably an end of the electrical conductor is configured to form the coupling region.

Preferably, the surface contact is formed from an electrical conductor having the same configuration as the coupling region.

Preferably the coupling region and the surface contact form an open ended two-line transmission line having a length approximately equal to an odd multiple of a quarter of the effective wavelength $\lambda_{\text{eff}}$ in the glazing corresponding to f. Alternatively, the surface contact may be a metal plate.

The antenna is preferably for at least one of AM, FM, UHF, VHF or SHF signals.

Preferably the glazing is a windscreen and the electrical conductor is positioned within the vision area of the windscreen, wherein the vision area is defined in accordance with ECE R43.

In a preferred embodiment, the electrical conductor is formed from a wire embedded within the plastics material. Alternatively, the wire may be adhered to a major face of the ply of transparent glazing material. The wire may comprise at least one of copper, tungsten, gold, silver, aluminium or an alloy thereof. The wire may have an electrically insulating coating. The wire may have an adhesive coating. The wire may have a thickness in the range of 10-500 µm, preferably 10-160 µm. Alternatively, the electrical conductor may be a region of printed electrically conductive ink on the surface of the first ply of transparent glazing material opposite the surface contact. The electrical conductor may alternatively be printed onto a surface of the layer of plastics material.

Preferably the glazing further comprises a second ply of a transparent glazing material, and the plastic material is a layer of interlayer material, laminated between the first and second ply of glazing material. The glazing may further comprise a second ply of a transparent glazing material, and the plastic material is a layer of interlayer material, laminated between the first and second ply of glazing material, and wherein the electrical conductor contacts a major face of the second ply of transparent glazing material. In both cases, the interlayer material is preferably polyvinyl butyral.

The plastic material may be a self-adhesive impact resistant film.

Preferably, the transparent glazing material is one of annealed, toughened or semi-toughened glass, or a plastics material.

If the ply of transparent glazing material is a single ply of toughened silicate float glass, then preferably, the plastic material is a self-adhesive impact resistant film.

The coupling region and surface contact may be positioned such that at least two antennae having a single coupling region are formed.

Two surface contacts may be used, the first surface contact being connected to the inner conductor of a coaxial cable, and the second surface contact being connected to the outer conductor of the coaxial cable.

The glazing may comprise at least one of a solar control or low-emission coating layer. The glazing may comprise an infrared reflective layer.

The ply of transparent glazing material may be a single-ply of toughened glass, and the plastics material comprises an electrically conductive material forming the surface on one surface.

The present invention will now be described by way of example only, and with reference to the accompanying drawings, in which:

FIG. 1b is a schematic cross section showing a close-up of the position of an antenna and a low-impedance radio-frequency connector in a laminated glazing, in accordance with the present invention;

FIG. 1c is a schematic plan view of the glazing in FIG. 1b;

FIG. 4 is a schematic perspective view of a first simulation configuration;

FIG. 5 is a schematic perspective view of a second simulation configuration;

FIG. 13 is a schematic exploded perspective view of a first broadband antenna configuration;

FIG. 14 is a schematic exploded perspective view of a second broadband antenna configuration;

FIG. 16 is a schematic cross-section of a bi-layer glazing having an antenna arrangement in accordance with the present invention.

Rather than relying on a physical contact to connect the antenna conductor to the wiring harness of a vehicle, the present invention provides an improved non-galvanic contact, which unlike conventional capacitive connectors does not require the use of an internal copper plate or similar means to achieve a high coupling capacity to the surface contact. In particular, in the present invention, transmission line coupling is the preferred method for coupling signals between the antenna conductor and the surface contact. Using transmission line coupling has the added advantage of providing band filter characteristics, where a low-impedance transmission frequency band of the combined surface contact and coupling region are adapted to a frequency band of the antenna conductor. Such antennae may be used for signals in a frequency range of 0.1 MHz to 6 GHz.

To achieve good radio frequency coupling, for example, it is generally necessary to provide a metal plate within the glazing as one of the plates of the capacitor. In WO99/66588A1, the plate is replaced by a wire grid, where the number of crossing points of the wire and the spacing between the wires is determined by the wavelength of the signal to be capacitively coupled. For an antenna on glass for use in a vehicle, one additional design consideration is the space available for the antenna connector, which in turn places a constraint on the acceptable size of the coupling region. For a vehicle antenna, the region available for the antenna connector has dimensions of the order of $\lambda/10$, where $\lambda$ is the wavelength corresponding to the bandwidth of the signal to be received. In experiments carried out in the course of the present invention, the use of grids having such dimensions as antenna connectors was investigated. It was discovered that capacitive grid arrangements of such restricted size were unable to provide sufficient signal coupling to act as antenna connectors, unless the wires forming the grid were placed close together. This dense wire packing causes the connector to be visible within the glazing. Therefore, a different approach was considered.

Figure 1A:
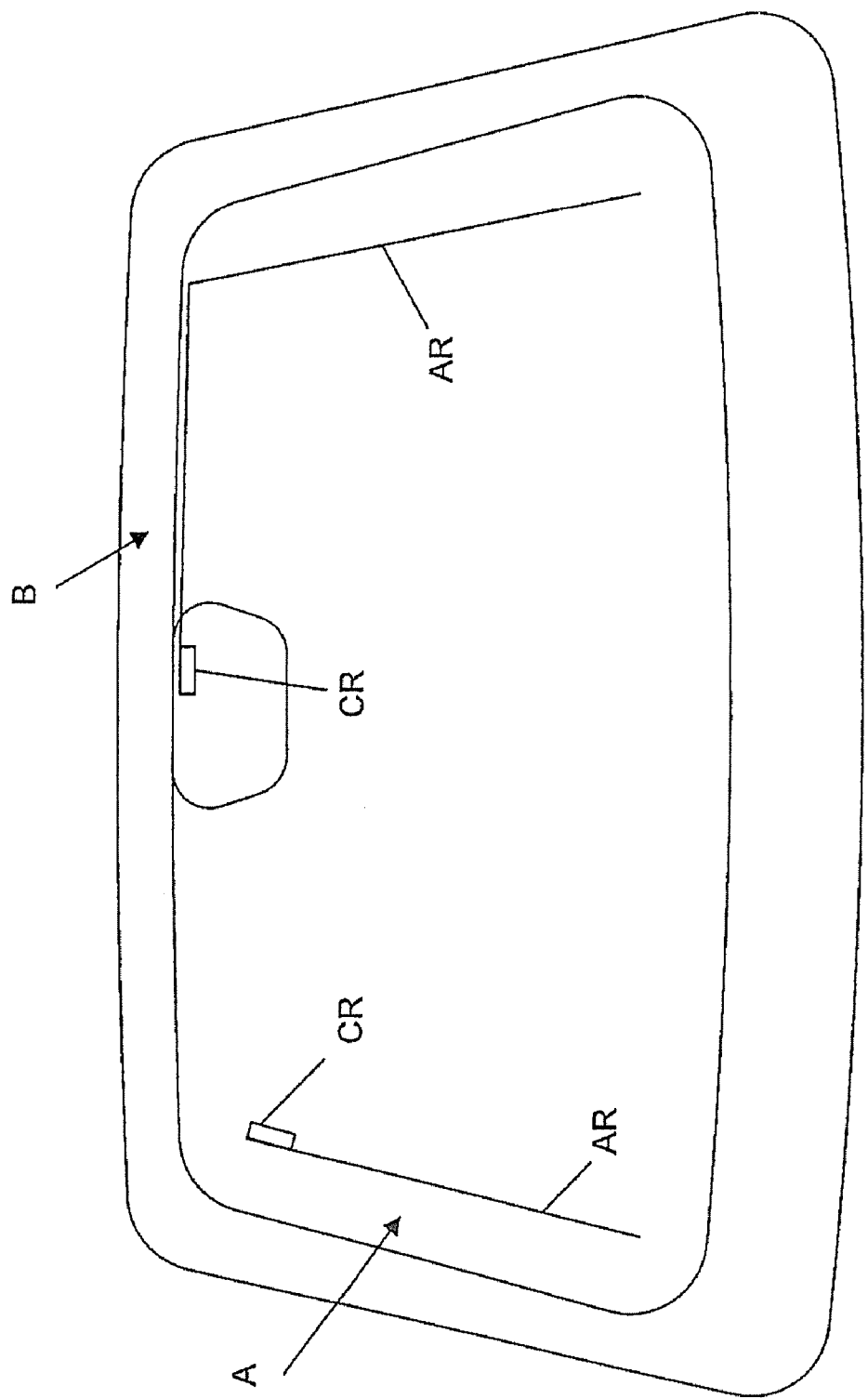
FIG. 1a is a schematic plan view of a windscreen showing the positions of two antennae.

As an alternative, a meander wire pattern may be used. Ideally, the length of the wire is one quarter of the wavelength (in the glazing) of the signal to be received. If the surface contact is also provided in the form of a wire or line, the coupling region and the surface contact act as a two-line transmission line to couple signals, as explained in more detail below. In addition, the length and width of the coupling regions in the preferred embodiments of the invention are significantly smaller than the length of the wire forming the coupling region, enabling low-impedance radio-frequency coupling to be achieved using a small area surface contact. This surface contact has a much smaller area than that required by prior art antenna connectors. For example, a typical length of an on-glass antenna is 45 cm, but the area of the coupling region and surface contact is in the region of 2 cm×6 cm=12 cm². This is illustrated in FIG. 1a. FIG. 1a is a schematic plan view of a windscreen showing the positions of two antennae, A, B, each having an antenna region AR and coupling region CR. Antenna A is positioned along the left-hand edge of the glazing, and would be covered by an obscuration band (not shown) when viewed from the outside of a vehicle in which the windscreen is fitted. Antenna B is and L-shaped antenna, having a coupling region positioned in the vicinity of the rearview mirror. In both cases, the length of the antenna region is at least an order of magnitude larger than the longest dimension of the coupling region.

A general example of transmission line coupling is shown in FIGS. 1b and 1c. FIG. 1b is schematic cross section showing the position of an antenna conductor and a band filter type low-impedance radio-frequency connector in a laminated glazing. The glazing 10 comprises first 11 and second 12 plies of transparent glazing material, in this case glass, having a layer of interlayer material 13 laminated therebetween. An antenna conductor 14 is provided in the form of a first portion of a line-like conductor, such as a wire, approximately 50 μm in thickness, laid into the surface of the interlayer material 13. Wiring techniques, where the wire is played out through a head mounted on a x-y plotting arm may be used to lay down the antenna wire on the surface of the interlayer material. A second portion of the wire is configured to form a coupling region 15, by laying down the antenna wire in a pattern comprising at least one reticulation. Such a reticulation is formed from at least one turn, leading to the wire effectively turning back on itself, forming a meander. When the glazing 10 is in use and a signal is received by the antenna conductor 14, low-impedance radio-frequency coupling takes place between this coupling region 15 and a surface contact 16. The surface contact 16 is positioned adjacent to the coupling region 15 on the inner surface of the glazing, facing into the vehicle when fitted, and is connected to the wiring harness of the vehicle (not shown) by leads 17. Ideally, the low-impedance radio-frequency coupling is transmission line coupling, as described in detail below. Most preferably, the coupling region and the surface contact form an open ended two-line transmission line having a length approximately equal to an odd multiple of a quarter of the effective wavelength $\lambda_{eff}$ in the glazing corresponding to f, where f is the frequency of the signal received.

FIG. 1c is a schematic plan view of the glazing 10, and shows the coupling region 15 in more detail. In this case, the coupling region 15 is formed by a meander 18, which has at least one reticulation, in the end of the wire, which at its other end forms the antenna conductor 14). The meander 18 is positioned above (in registration with) the surface contact 16 (shown in dotted lines as it is viewed through the glazing 10). This enables low-impedance radio-frequency coupling between the coupling region 15 and the surface contact 16 to take place. The surface contact 16 may, for example, be an area of conductive ink on the surface of the glazing, or may be a plate-like metal contact either soldered or adhered to the surface of the glazing. The surface contact 16 may be a solid region, such as a printed patch, or an open region, such as a printed grid or mesh that acts effectively as a metal plate. Depending on the configuration of the surface contact 16, it may only need to overlap the coupling region 15, rather than being in complete registration. Preferably, the surface contact 16 is designed as transmission line that co-operates with the coupling region 15, which is also a transmission line, to form a band filter for a frequency band of the antenna conductor. In this case, the contact should ideally run in parallel to the coupling region as much as possible, and be arranged in registration therewith to achieve a minimum radio frequency impedance at the respective frequency band.

Figure 2C:
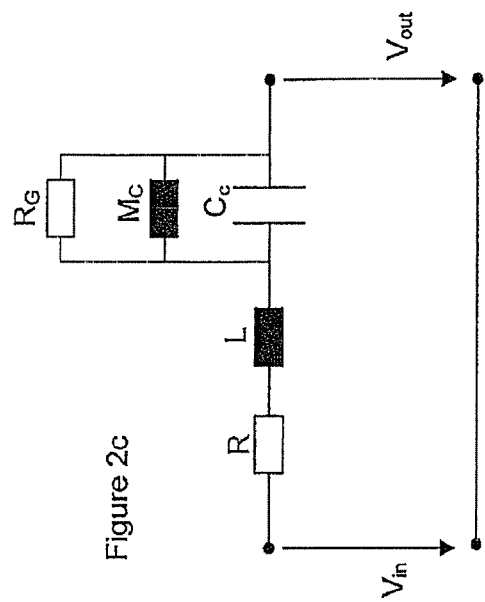
FIG. 2c is a schematic illustration of a two-line transmission line.
Figure 2A:
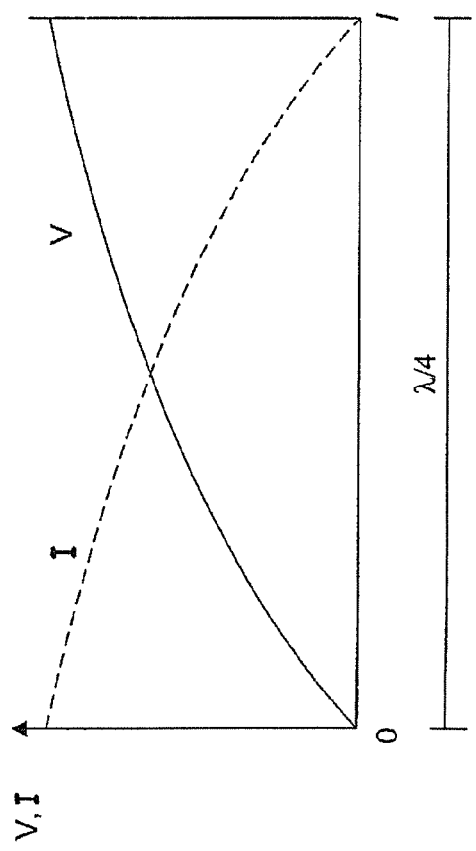
FIG. 2a is a schematic graph of current and voltage over the $\lambda/4$ length of an open two-line transmission line.
Figure 2B:
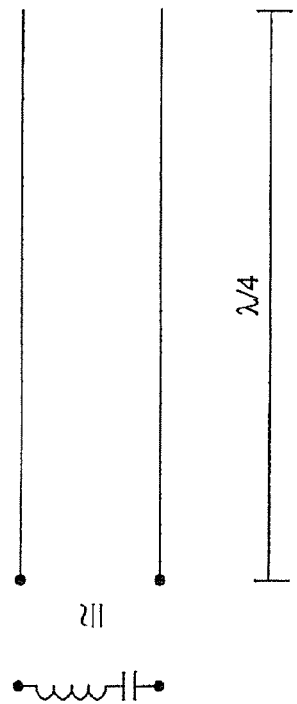
FIG. 2b is an equivalent circuit diagram for transmission line coupling.

FIGS. 2a, 2b and 2c are schematic diagrams explaining the transmission line coupling process. In the present invention, the coupling region and the surface contact act as an open two-line transmission line. In a two-line transmission line, the E waves (electric field) and H waves (magnetic field) are transverse. FIG. 2a is schematic graph of current and voltage over the $\lambda/4$ length of an open two-line transmission line. Incident E and H travel along the line from 0 to l. At l, the incident waves are completely reflected (reflection factor=1). The reflected waves are therefore equal in magnitude to the incident waves, such that the waves superpose and set up a standing wave. The standing wave formed has the current (I) voltage (V) relationship shown in FIG. 2a: maximum current and minimum voltage at 0, minimum current and maximum voltage at l. At the point where the voltage is equal to zero, a short cut (resonance) occurs, and energy is transferred. No radiation of energy occurs at any other point along the transmission line due to the standing wave. The two-line transmission line arrangement may also be thought of in terms of two antennae, where one antenna radiates a signal in a particular bandwidth to the other antenna.

FIG. 2b is an equivalent circuit diagram showing the resistance, inductance and capacitance of the two-line transmission line. Wire resistance R is connected in series with wire inductance L, and capacitance C representing the capacitive coupling of the two wires. M represents the inductive coupling of the wires, and $R_G$ the electrical loss due to the dielectric constant of the glass. M, C and $R_G$, are connected in parallel. $V_{in}$ and $V_{out}$ are the input and output voltage to the line respectively.

FIG. 2c is a schematic illustration of a two-line transmission line showing that in effect, at point 0, the line acts effectively as an inductor and capacitor in series, allowing the transfer of energy (current) via a short cut at resonance. FIG. 2b simplifies to FIG. 2c at resonance, and the inductor and capacitor act as a filter at the resonant frequency. Consequently, current can be transferred at a particular frequency band f corresponding to the wavelength λ in the glazing for which the transmission line length is equal to λ/4 in the glazing without attenuation. At any other frequency, loss occurs due to an additional resistance factor caused by the transmission lines themselves. The transmission line coupling therefore has both a capacitive and an inductive component. Resonance will in fact occur at any odd multiple of λ/4, for example 3λ/4, 5λ/4, 7λ/4 and so on.

Although therefore a straight two-line transmission line is ideal for forming an antenna connector, the space required for such a line is not available in the region of a glazing designated for an antenna connector by a vehicle manufacturer. Therefore, to provide the smallest possible area, the transmission line must be folded in some way (for example, by containing turns or reticulations) to minimise the size of the coupling region and surface contact. This reduces the visibility of the antenna connector on the glazing. Consequently, the transmission line (coupling region) must be small in comparison with the overall length of the antenna to which it connects. This is achieved by adapting the length of the wire, the spacing between the wire reticulations and the number of reticulations in the meander pattern to a wavelength region (frequency band) which the antenna conductor receives.

By configuring a second portion of the wire, a first portion of which forms the antenna conductor, to faun a coupling region, the need to solder any form of contact or wire to the antenna conductor on the surface of the interlayer material is removed. During production of the laminated glazing, the glass/interlayer/glass assembly may be de-aired easily using rollers, rather than a vacuum ring system. In addition, as there is no undue stress on the edge of the laminated region, the risk of delamination and glass cracking in the final glazing is minimised.

By using thin wires (wires having a thickness in the range 10-150 μm) it is possible to include the antenna and/or the coupling region within the vision area (as defined by ECE R43) of a glazing, as the resulting wiring is practically invisible from both inside and outside when the glazing is fitted within a vehicle. This is an important advancement compared with traditional antennae, particularly in the case of AM antennae. AM antennae require a large surface area or long antenna length in order to receive low frequency radio transmissions, and so cannot normally be included simply within the structure of a windscreen. By using a thin wire, a large area or long length antenna may be included in the glazing as it may stretch into the vision area of the glazing without impeding the view through the glazing. The wires used preferably comprise copper, tungsten, gold, silver, aluminium or an alloy thereof, and may have an insulating and/or adhesive coating. The wires used to form the antenna conductor portions do not need to be straight, but can be any other suitable shape, including L-shaped and U-shaped. If the wires are provided with an insulating coating or deposited on different surfaces of the interlayer, they may be arranged to overlap or cross each other. No detrimental effect on the effective length needed to provide transmission line characteristics occurs, due to the wires being electrically isolated from each other. If wires without such insulation are used, wire crossings causing non-intentional short-circuiting should be avoided. The wire may comprise a tear-resistant core, for example, stainless steel, coating with a highly electrically conductive material such as copper or the like.

Figure 3:
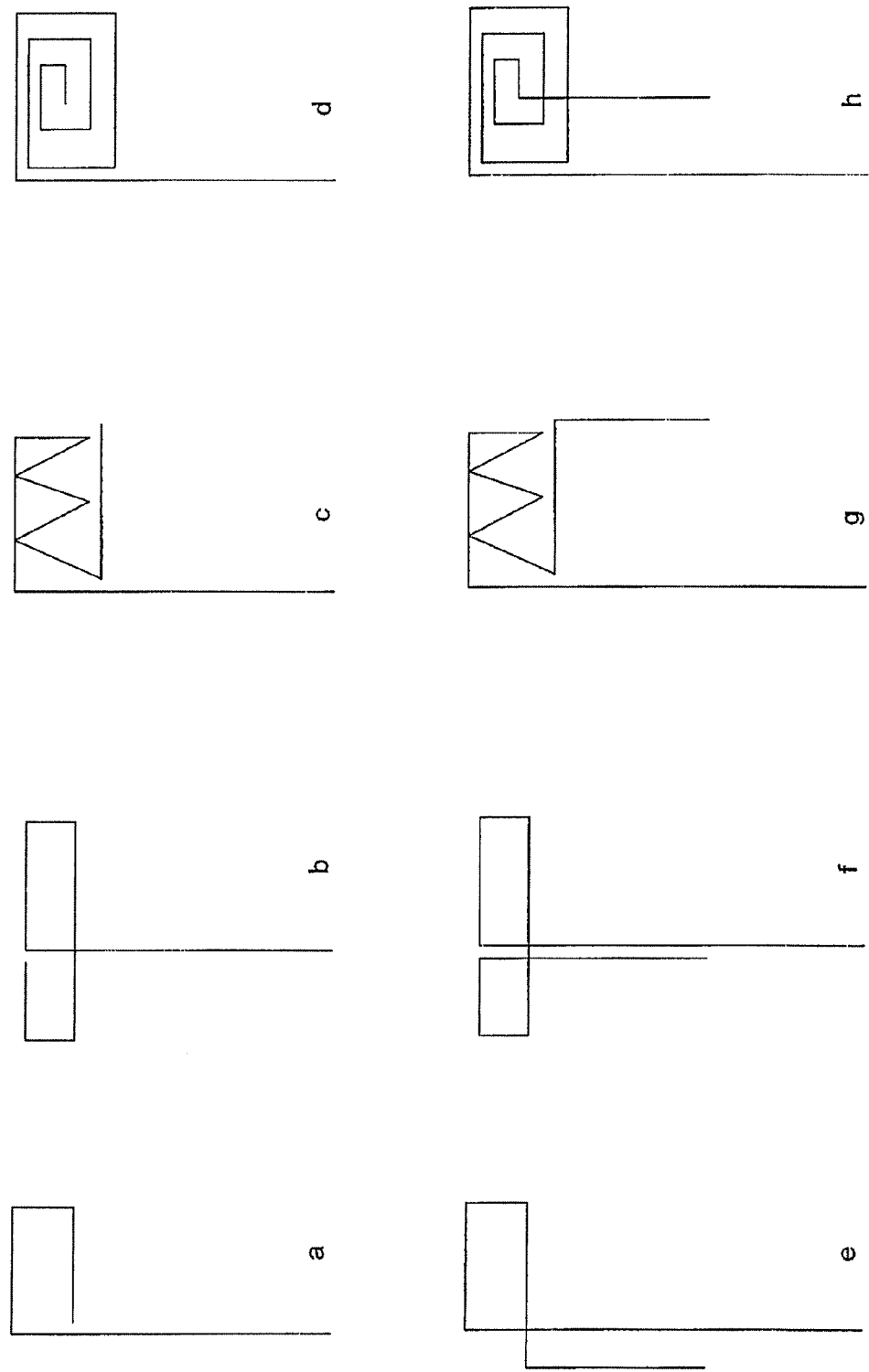
FIGS. 3a-3h show various antenna wire configurations for realising low-impedance radio-frequency coupling.

Although the example coupling region 15 shown in FIG. 1b is a simple loop, other wire configurations may be used. FIGS. 3a-3h illustrate example coupling region configurations. The antenna (straight wire) sections are not shown to scale. FIG. 3a shows a single loop; FIG. 3b shows a double loop; FIG. 3c shows a saw-tooth pattern and loop combination; and FIG. 3d shows a polygonal spiral pattern. FIG. 3e shows a more complex single loop having a tail section; FIG. 3f shows a double loop having a tail section; FIG. 3g shows a saw-tooth pattern having a tail section, rather than a loop; and FIG. 3h shows a polygonal spiral pattern with a tail section. Other transmission line configurations, not shown here, but providing sufficient low-impedance radio-frequency coupling may be used instead.

In order to determine the suitability of such low-impedance radio-frequency coupled connectors for use with antennae within automotive glazings, three simulation configurations were designed and the coupling up to 1 GHz between each of the wire coupling regions and a surface contact was modelled. In each configuration, the wire coupling region is situated on one surface of a single ply of glass, with the surface connector position on the opposite surface. The signals were coupled between the coupling region and the surface contact.

Figure 6:
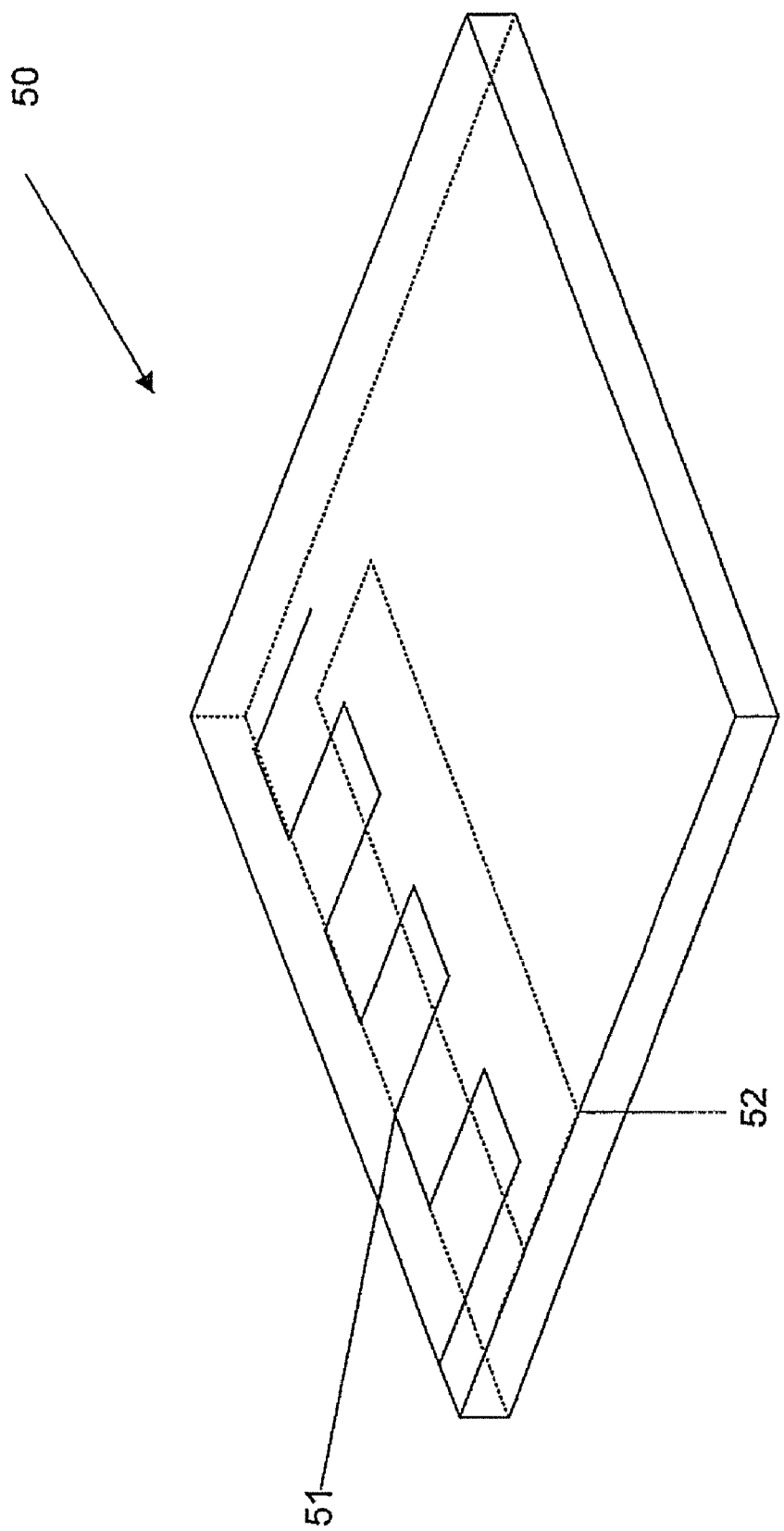
FIG. 6 is a schematic perspective view of a third simulation configuration.

FIG. 4 (configuration) is a schematic perspective view of a ply of glass 30 having a meander wire pattern 31 on the upper surface, representing a coupling region, and a meander wire pattern 32 on the lower surface, representing a surface contact. The coupling region and the surface contact are in registration with each other. FIG. 5 (configuration 2) is a schematic perspective view of a ply of glass 40 having a meander wire pattern 41 on the upper surface, representing a coupling region, and a simple wire loop 42, on the lower surface, representing a surface contact, in registration with the coupling region. FIG. 6 (configuration 3) is a schematic perspective view of a ply of glass 50 having a meander wire pattern on the upper surface, representing a coupling region, and a simple wire loop 52 on the lower surface, representing a surface contact. The meander region 51 only overlaps a part of the loop 52, and so is not in full registration. In each configuration, the wire forming the meander had a total geometrical length of approximately 200 mm, which corresponds to approximately one quarter of the effective wavelength ($\lambda_{eff}$) corresponding to a frequency band f, where f =200 MHz for a straight conductor located on a glass surface. Although in this example, the length of the wire is equal to $\lambda_{eff}/4$, it may alternative be equal to $3\lambda_{eff}/4$, $5\lambda_{eff}/4$, $7\lambda_{eff}/4$ etc, as long as the multiple of $\lambda_{eff}/4$ is odd.

Figure 7:
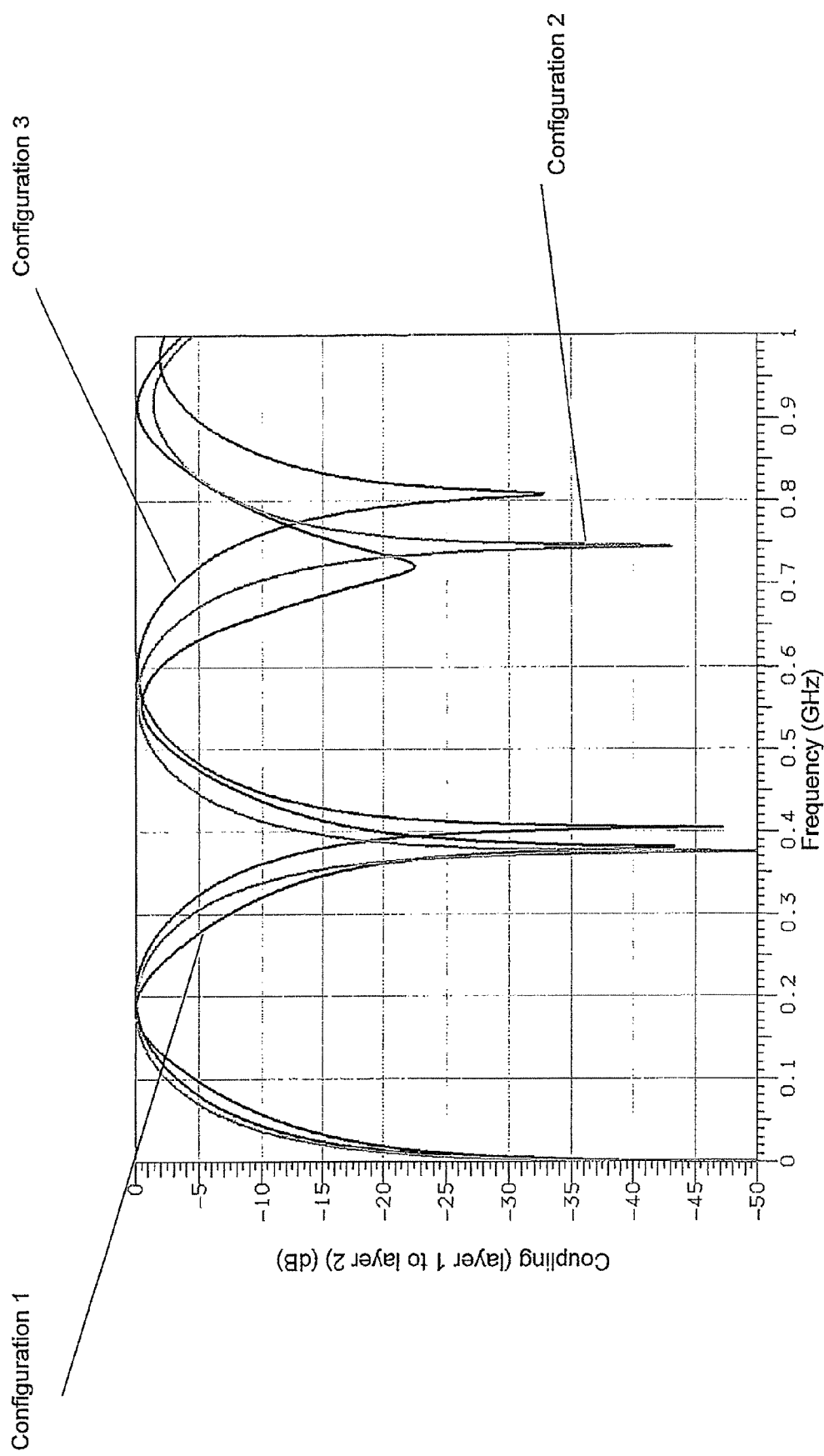
FIG. 7 is a chart showing coupling for the three simulation configurations over 0-1 GHz.
Figure 8:
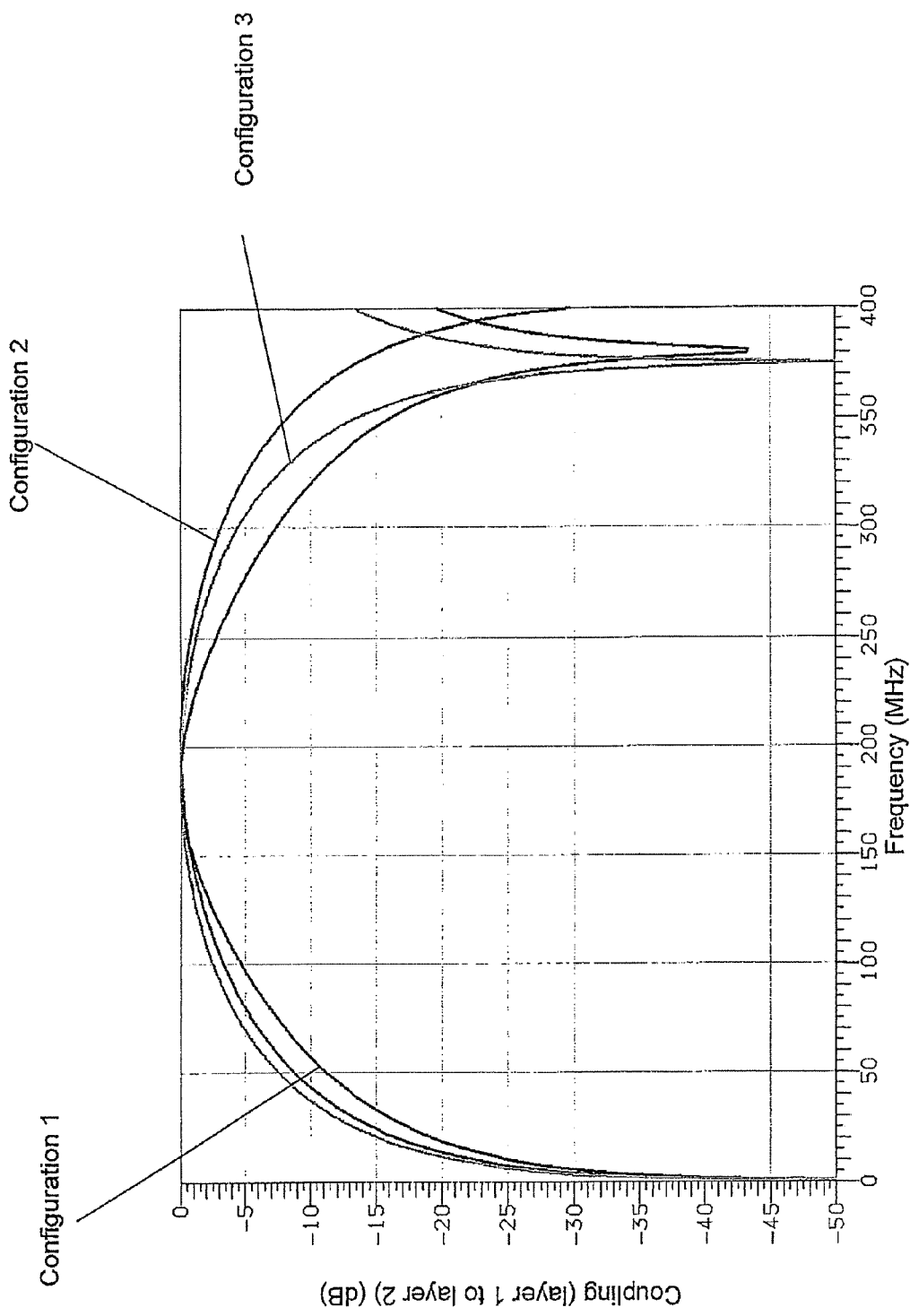
FIG. 8 is a chart showing coupling for the three simulation configurations over 0-400 MHz.

FIGS. 7 and 8 are charts showing the results of the simulations for all three configurations over 0-1 GHz and 0-400 MHz respectively. Good coupling is achieved at 0 dB (zero loss), and all three configurations show good coupling at odd multiples of approximately $\lambda_{eff}/4$.

Following the simulation results, two samples were made to test the actual coupling possible using commercially available glazing components.

A first test sample was prepared having the basic construction shown in FIG. 5. The coupling region of the wire in this example was designed to act as a transmission line. A meander patterned wire having 20 turns, and having a total length (corresponding to a quarter wavelength λ/4 of the frequency band to be transmitted) of 520 min was laid out on a ply of PVB (polyvinyl butyral) 0.76 mm in thickness. This length corresponded to a frequency of about 100 MHz on toughened glass. The effective wavelength of wiring placed onto the surface of a ply of glass, $\lambda_{eff}$, is subject to a shortening factor compared with the wavelength of the wire in air, $\lambda_{air}$.

A side feed wire, in the form of a rectangle 60 mm by 20 mm, was laid out on the lower surface of a ply of 2.1 mm thick silicate float glass, which also supported the ply of PVB on its upper surface. The wire used was 50 µm in thickness.

Figure 9:
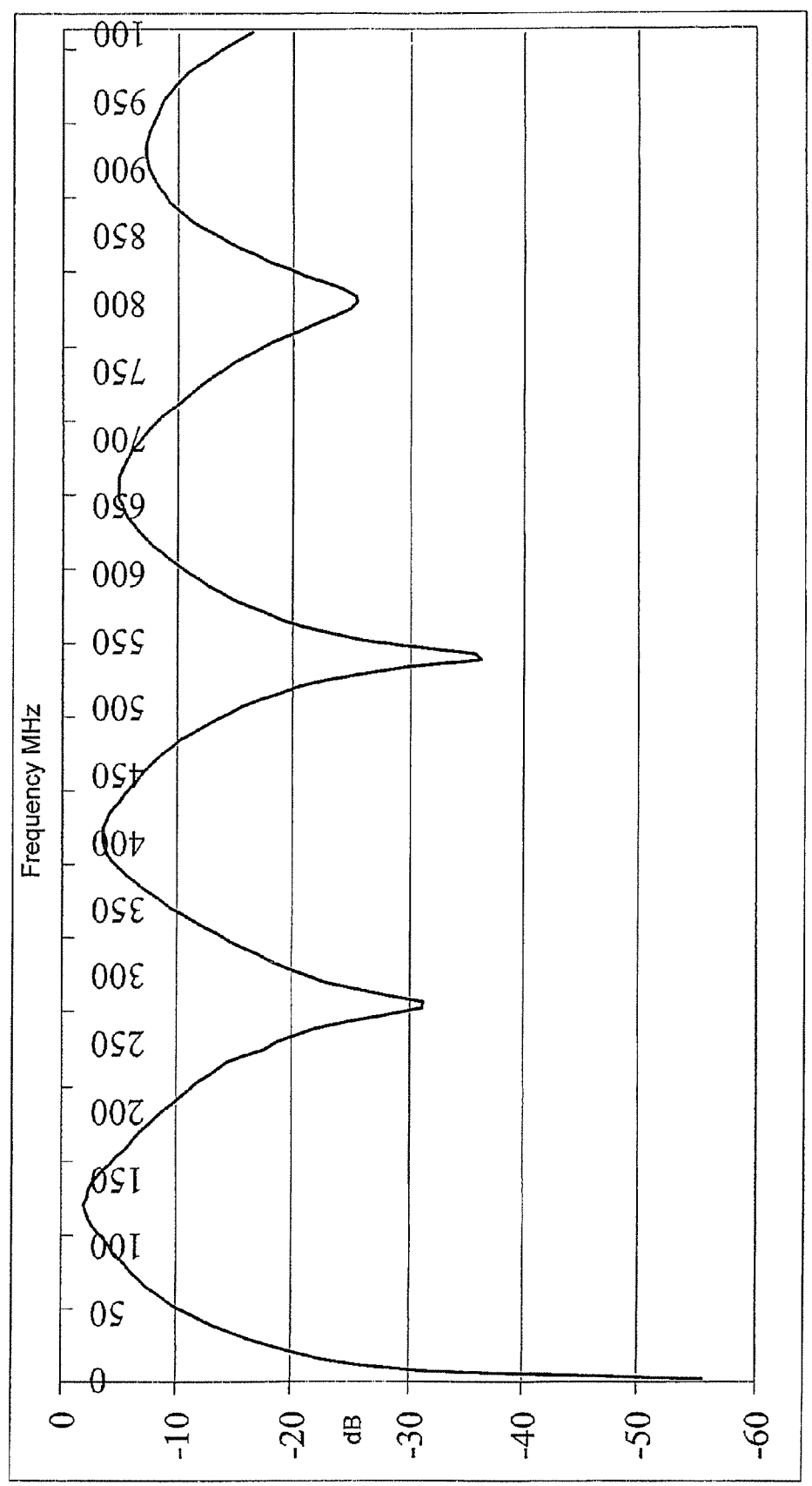
FIG. 9 is a chart showing coupling over 0 to 1 GHz for a first test sample having the construction shown in FIG. 5.

FIG. 9 is a chart showing the radio frequency coupling achieved over the range 0 to 1 GHz. Good coupling was achieved at those frequencies corresponding approximately to odd multiples of $\lambda_{eff}/4$. The distance between coupling maxima decreases as frequency increases, as a result of the shortening factor.

Figure 10:
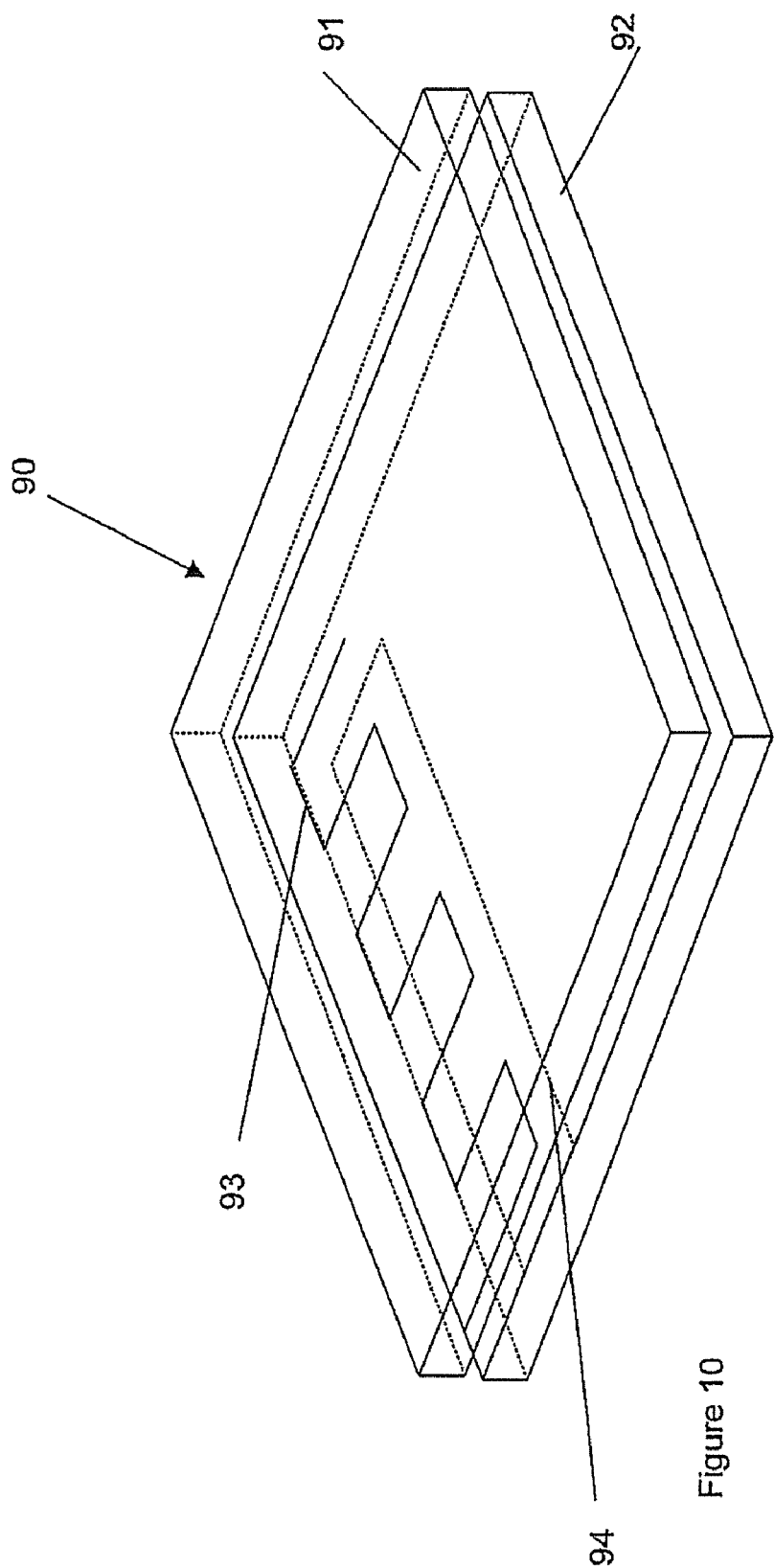
FIG. 10 is a schematic exploded perspective view of the laminated configuration of a second test sample.

FIG. 10 is a schematic exploded perspective view of a second test sample of a laminated construction. The laminated structure 90 comprised a first 91 and second 92 ply of 2.1 mm thick silicate float glass having a 0.76 mm thick PVB interlayer (not shown), laminated therebetween. A meander wire configuration 983, comprising 20 turns (only some of which are shown in the drawing) of 50 µm thick wire making a total length of 520 mm was embedded in a surface of the PVB interlayer. A side feed wire 94 forming a surface contact, in the form of a rectangle having the dimensions 60 mm by 20 mm was laid out on the surface of the second ply of glass 92. The test sample was included in a windscreen for an automotive vehicle.

Figure 11:
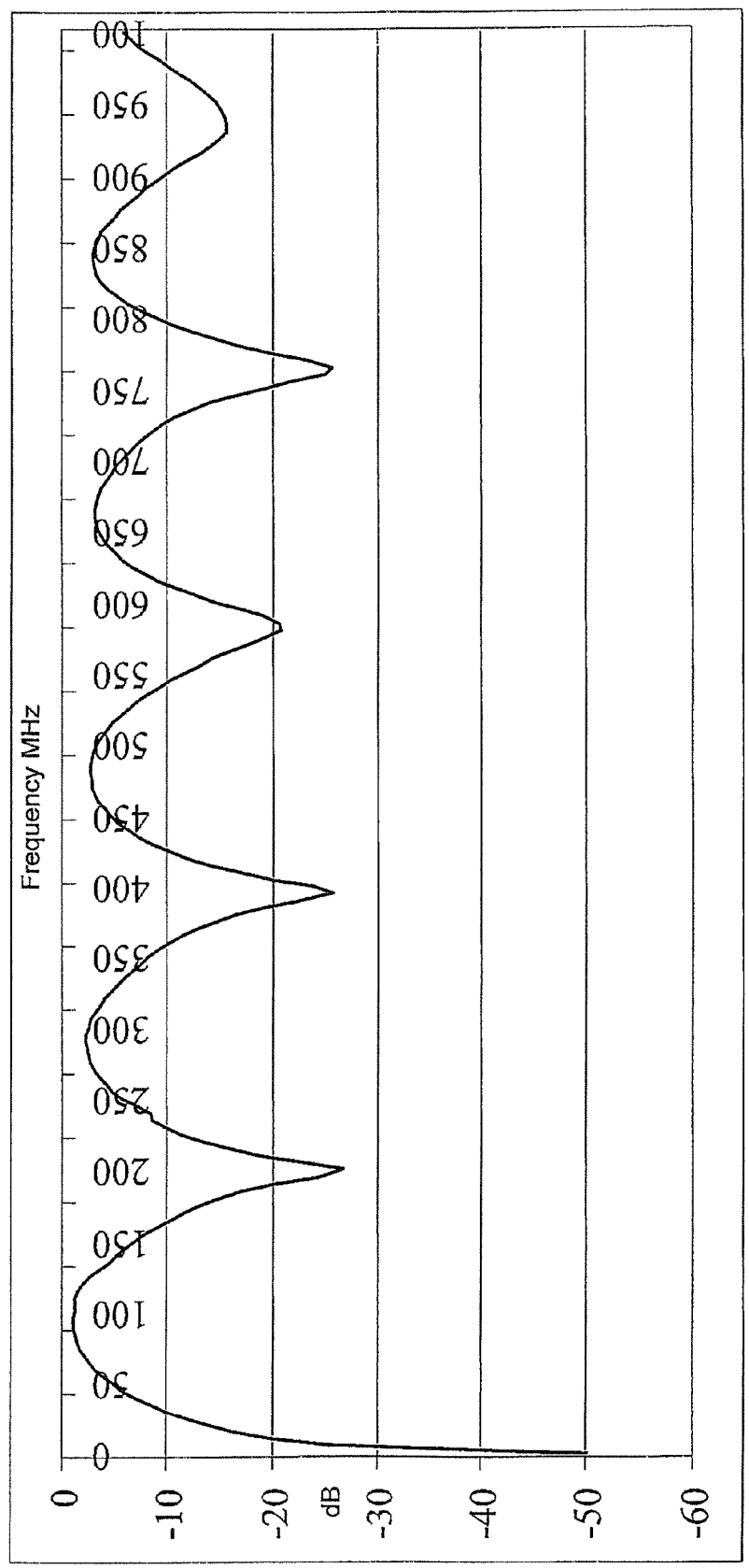
FIG. 11 is a chart showing coupling over 0 to 1 GHz for the sample of FIG. 10.

FIG. 11 is a chart showing the coupling achieved over the range 0 to 1 GHz.

In the examples used above, a frame-like surface contact was used in both simulations and experimental trials. However, as part of the simulation work, it was determined that the most effective transmission line coupling occurred when both the coupling region and the surface contact took the same form, for example, were exact images of each other, and were placed in registration on either side of a glass ply. Preferably, the surface contact is designed as a transmission line adapted to a frequency band of the antenna conductor and of the coupling region. For a transmission line surface contact, the contact needs to be arranged essentially parallel to the coupling region, and its terminal leading to the vehicle radio or the like (the wiring harness) needs be located adjacent to the region of the wire where the antenna conductor ends and the coupling region begins. This is because coupling between two parallel $\lambda_{eff}/4$ length conductors takes place only when the conductors run parallel, and when their end points are located adjacent to each other where they contact a coaxial cable or the like. In the case of a plate-like surface contact that acts effectively as a mirror for the coupling region transmission line, the metallic plate may by contacted anywhere by the inner wire of a coaxial cable leading to the radio or wiring harness.

Figure 12C:
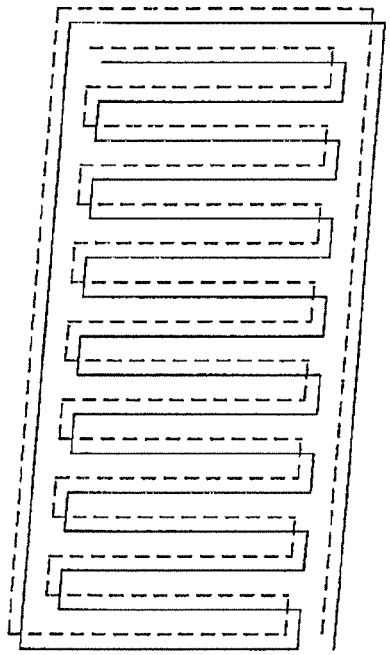
FIGS. 12a to 12h are schematic exploded views of simulation configurations of preferred antenna connector designs.
Figure 12D:
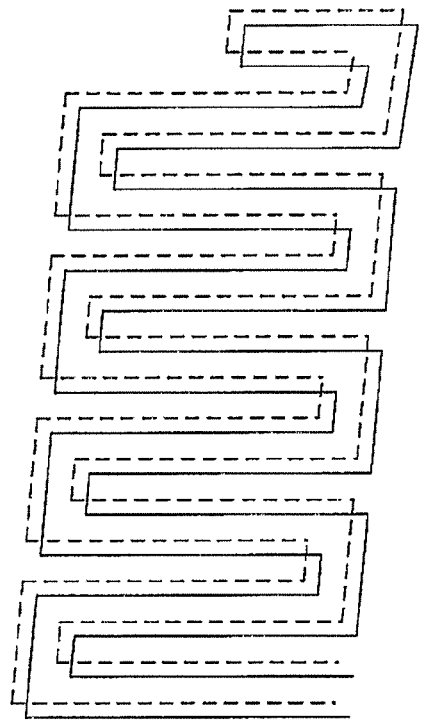
Figure 12A:
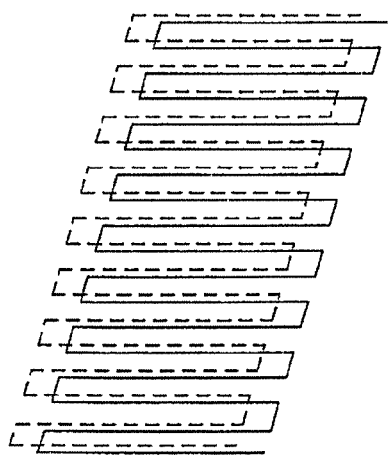
Figure 12B:
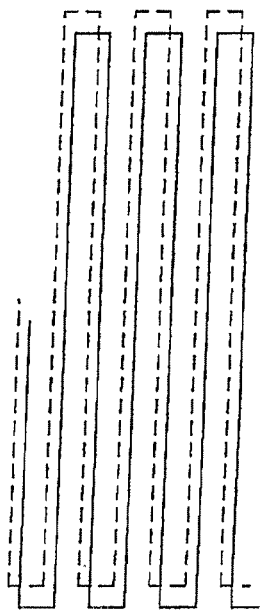
Figure 12G:
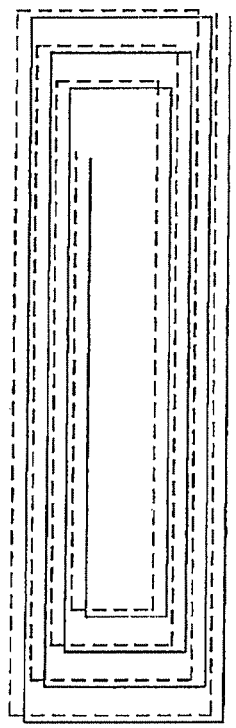
Figure 12H:
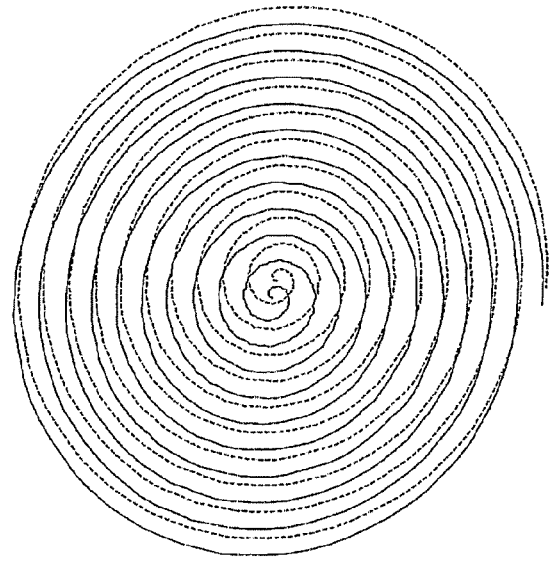
Figure 12E:
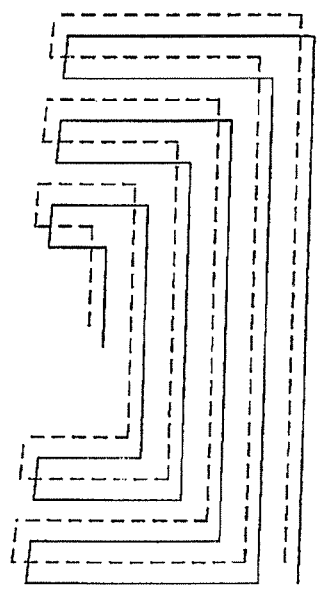
Figure 12F:
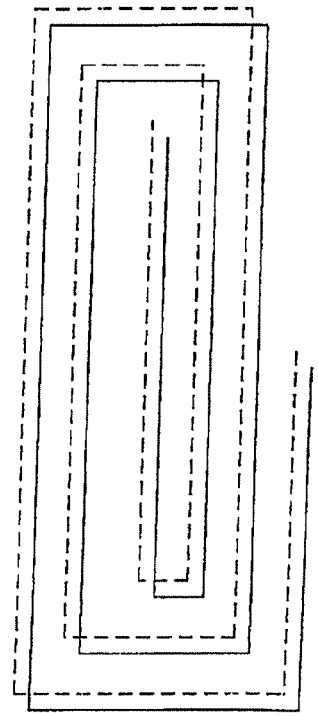

FIGS. 12a to h are schematic representations of coupling region and surface contact designs used during simulations. FIGS. 12a and b are simple sets of vertical and horizontal reticulations (meanders) respectively. FIG. 12c is a simple set of vertical reticulations surrounded by a rectangular frame. FIG. 12d is a more complex set of vertical reticulations, and FIG. 12e is a combination of vertical and horizontal reticulations. FIGS. 12f, g and h are spiral patterns, with both FIGS. 12f and 12g being polygonal spirals (based on a rectangle) and FIG. 12h being a circular spiral. Simulations were carried out using each of the designs illustrated, and the following parameters compared:

3 dB bandwidth (bandwidth of the transmission window,)
$S_{21}$ (transmission characteristic: 0 is perfect transmission, increasing negative value indicates attenuation)
First resonance for laminated glass Table 1 lists these parameters, as well as coupling region area and mechanical length of wire used. The glass thickness used in calculations was 2.1 mm, and the wire assumed to be a perfect electrical conductor. The column entitled "Antiparallel length" indicates the length of the wire in which antiparallel currents flow (where reticulations having opposed currents flowing are adjacent).

TABLE 1 simulation results for transmission line coupling regions and surface contacts

| Design (FIG. no.) | Mechanical length (mm) | Coupling region area (mm²) | 3 dB bandwidth (MHz) | $S_{21}$ (dB) | Antiparallel length (mm) | First resonance (laminated) (MHz) |
|---|---|---|---|---|---|---|
| 12a | 410 | 1020 | 66.5 | −0.13 | 360 | 94 |
| 12b | 410 | 1080 | 69 | −0.12 | 390 | 94 |
| 12c | 388 | 960 | 71 | −0.13 | 231 | 94 |
| 12d | 391 | 1020 | 69 | −0.13 | 391 | 94 |
| 12e | 412 | 1200 | 66.5 | −0.13 | 15 | 90 |
| 12f | 368 | 1020 | 59 | −0.15 | 0 | 92 |
| 12g | 354 | 410 | 33 | 0.37 | 0 | 93 |
| 12h | 328 | 299 | 40 | −0.57 | 0 | 97 |

From these simulations, the circular spiral structure shown in FIG. 12h is the most preferred construction for a vehicle antenna. This is because with such patterns the coupling region has the smallest area for a specific frequency band/wavelength range, and the geometrical wire length needed to provide the coupling region with transmission line characteristics for that frequency band is a minimum.

A spiral-type structure has other advantages. When folding or curving a wire in the coupling region it is necessary to ensure that adjacent wire portions through which current flows in opposed directions (anti-parallel currents) are a minimum distance from each other, in other words, a distance greater than at which electrical current cancelling out effects occur. This is to avoid cancelling out the radiation used to transmit signals received by the antenna conductor. As an example, for coupling regions with a meander or reticulation wire the separation distance between adjacent wire portions having opposite current flow direction located on a 2.1 mm thick glass pane should be at least about 1.2 mm if the surface contact is a transmission line adapted to the coupling region. This separation distance should be at least about 2 mm if the surface contact is a plate-like metallic area. If the separation distance is decreased below these values the effective length of the transmission line(s) is decreased and the band width of the band filter is increased. In the case of the preferred circular spiral configuration described above, the distance between the centre of the spiral and first turn should be of the order of the thickness of the glass separating the coupling region and the surface contact for optimum performance. Preferably, therefore, the adjacent wire sections have parallel currents.

In the simulations detailed above, the mechanical length of the wire used is given. The mechanical length of the wire to be deposited in the coupling region forming a transmission line primarily depends upon the frequency band to be transmitted. As discussed above, for transmission line coupling, this length is preferably set to be equal to an odd multiple of the effective quarter wavelength of the required frequency band. The mechanical length of the wire is typically lower than the quarter wavelength measured in air due to the shortening factors stemming from the dielectric constants of the adjacent materials (the glass or interlayer material in laminated glazings or combinations of these). The mechanical length needed is increased if the separation distance between adjacent wire portions having opposite current flow direction is short. This compensates for the loss of effective length caused by cancelling out of transmitted energy by such adjacent wire portions.

In practice the optimum mechanical length is determined first by estimating a quarter wavelength for a coupling region wire portion deposited in a folded/reticulated/curved configuration based upon known shortening factors of the glass and interlayer materials used. Then, various different lengths in the region of the estimated length are tested to determine the radio frequency impedance for such different coupling portion wire lengths, until the lowest impedance for the relevant frequency band is found.

The region of an antenna connectors described above is foamed from a length of wire or other electrical conductor having a length equal to an odd multiple of an effective wavelength in a glazing $\lambda_{\mathit{eff}}/4$ corresponding to a frequency f for which the connector acts as a bandpass filter. However, the antenna itself is also equal in length to an odd multiple of an effective wavelength in a glazing corresponding to f, but the effective wavelength may be different to the coupling region. This is because additional shortening factors affect the length of the coupling region but not the antenna (such as interlayer and the glass and the antiparallel current effects for the coupling region, compared with the interlayer, glass and the air only for the antenna). Therefore, in practice the length of the antenna corresponds to odd multiples of $\lambda_{\mathit{eff}A}/4$, where this relates to the second effective wavelength of the antenna corresponding to f. For wiring placed on a PVB interlayer within a laminated glazing structure, the shortening factor is approximately 0.6, for a ply of glass it is approximately 0.7.

As described above, antenna connectors in accordance with the present invention act as bandpass filters. Bandpass filter type connectors provide a decreased sensitivity against disturbances stemming from adjacent metal parts of a vehicle body, such as the metal flange of the window frame, compared with capacitively coupling connectors. It is possible therefore to locate connector arrangements in accordance the present invention nearer to the vehicle body than conventional capacitive connectors. This provides vehicle designers with a greater number of design options and flexibility, and makes connections to the vehicle wire harness easier. Plate-like surface contacts require a greater minimum distance between themselves and neighbouring metal vehicle parts than if identical transmission line contacts are used. This is because a plate-like surface contact acts as a mirror for the coupling region thereby doubling the effective distance between coupling region and surface contact. This creates stronger parasitic effects from metal parts located at the same distance to the coupling region for the plate-like surface contact than for the transmission line surface contact.

In addition, bandpass filter type of connectors in accordance with the present invention, formed using thin wires, typically have a capacitance that is significantly less than the capacitance of a conventional connector using a capacitor plate as coupling region inside the laminated glass pane. Measured with conventional capacitance meters in the kHz-region, the capacitance of a connector arrangement in accordance with the present invention will be of the order of 1/100 of the capacitance of a conventional capacitive connector.

A further advantage to using the antenna connectors of the present invention is their design flexibility. Although all of the antenna connectors described above are generally symmetric, this is only appropriate if the region of the glazing for the antenna connector designate by a vehicle manufacturer is generally symmetric. However, an advantage of using wires to form both coupling region and surface contact is that the shape of the coupling region and surface contact may be made asymmetric. For example, a spiral connector may be formed using an ellipsoidal or trapezoidal shape. As long as the general considerations of wire spacing (to avoid cancellation effects) and current direction (to avoid antiparallel current effects) are taken into account, the shape coupling region and/or surface contact may be any shape that fits within the designation region of the glazing. Due to these factors, it is possible to place an antenna connector in accordance with the present invention in a position closer to the bodywork of a vehicle than with known capacitive antenna connectors.

In the examples above, the coupling region comprises a first wire portion for transmitting a first frequency band. However, it is possible to form broadband antennae in accordance with the present invention, by providing the coupling region with a second wire portion for transmitting a second frequency band to the surface contact, and optionally further wire portions to transmit further frequency bands if required.

FIG. 13 is a schematic exploded perspective view of a first broadband antenna configuration. In order to simplify the Figure, only a single ply of glass 110 of the glazing is shown. Dashed lines are used to indicate that the relative length of the monopole antennae is greater than shown in the Figure. A meander wire pattern 111 acting as a coupling region is positioned on the upper surface of the ply of glass 110, and a rectangular side feed 112 forming a surface contact is positioned on the lower, opposite surface of the ply of glass 110. Each end of the meander wire 111 is provided with a straight antenna conductor (illustrated as a thick line) acting as a monopole antenna to receive signals of other frequencies: a first wire 113 has a length of $\lambda_{\mathit{eff}A}/4$ of the wavelength on the surface of the glass corresponding to 300 MHz; and a second wire 114 has a length of $\lambda_{effA}/4$ of the wavelength on the surface of the glass corresponding to 100 MHz. This construction forms a (dualband) broadband antenna, and may be placed within a laminated structure similar to that shown in FIG. 10 easily.

FIG. 14 is a schematic exploded perspective view of a second broadband antenna configuration, based on the same principle as that shown in FIG. 13. In order to simplify the Figure, only a single ply of glass 120 of the glazing is shown. Dashed lines are used to indicate that the relative length of the monopole antennae is greater than shown in the Figure. First A and second B sub antennae each comprising coupling regions of meander wire patterns are positioned on the upper surface of the ply of glass 120, and a rectangular side feed 121 is positioned on the lower, opposite surface of the ply of glass 120. No galvanic connection exists between the first sub-antenna and the second sub-antenna. Each meander wire forming the coupling regions of sub antennae A, B is provided with two straight antenna conductors forming monopole antennas. This enables each sub-antenna A, B to be used to receive a particular frequency band. For sub antenna A, a first antenna conductor 122 has a length of $\lambda_{effA}/4$ of the wavelength on the surface of the glass corresponding to 100 MHz and a second antenna conductor 123 has a length of $\lambda_{effA}/4$ of the wavelength on the surface of the glass corresponding to 300 MHz. For sub antenna B a first antenna conductor 124 has a length of $\lambda_{effA}/4$ of the wavelength on the surface of the glass corresponding to 600 MHz and a second antenna conductor 125 has a length of $\lambda_{effA}/4$ of the wavelength on the surface of the glass corresponding to 200 MHz. This construction therefore forms a broadband antenna, and may be placed within a laminated structure similar to that shown in FIG. 10 easily. Alternatively, other combinations of wire lengths to receive other frequencies may be used instead. The wires used to form the antenna conductors do not need to be straight, but can be any other suitable shape, including L-shaped and U-shaped.

Figure 15:
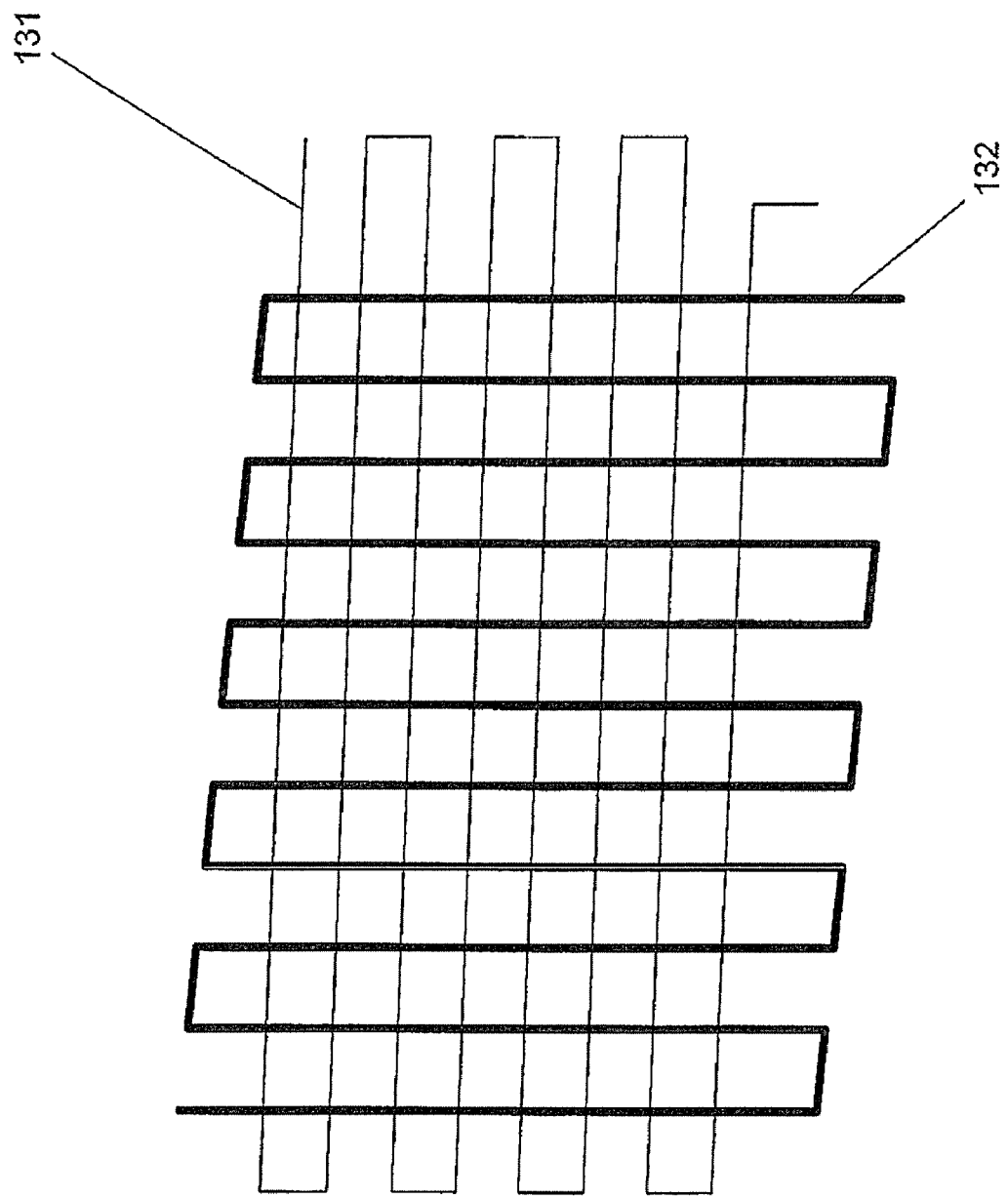
FIG. 15 is a schematic diagram of an alternative broadband antenna connector.

FIG. 15 is a schematic diagram of an alternative broadband antenna connector, again designed to overcome the attenuation at $\lambda_{eff}/2$. Rather than having two coupling regions side by side, the connector employs two overlapping coupling regions, oriented at 90° relative to each other. A first coupling region 131 comprises substantially horizontal reticulations, and a second coupling region 132 comprises substantially vertical reticulations. The reticulations may be formed by wires embedded in opposite surfaces of a ply of interlayer material, or by overlapping wires on one surface of an interlayer material having an electrically insulating coating. The wires need to be electrically isolated from each other in order for transmission line coupling to take place. Each coupling region is configured to act as a bandpass filter for a particular bandwidth, for example, 100 MHz and 200 MHz, where each transmission line corresponds to $\lambda_{eff}/4$ for one wavelength corresponding to the frequency band.

Alternatively, a dualband antenna may be formed by placing the coupling region in the centre of the antenna connector, such that at least two antennae with a common coupling region are formed from a single electrical conductor.

The transparent glazing materials used in glazings utilising the antenna connectors of the present invention are preferably glass. More preferably, the glass is annealed, toughened or semi-toughened glass, and may be coated, tinted or clear. Other transparent glazing materials, including plastics materials such as polycarbonate, may be used to form at least one of the plies of the laminated structure. Preferably, the interlayer material used is a plastics material. Plastics materials are typically non-conductive, and polymer-based. Suitable materials included polyvinyl butyral, EVA (ethylene vinyl acetate co-polymer), polycarbonate, ionomer films, isoplast films and polyethylene terephthalate, with other materials being well known within the field of automotive glazings. The interlayer material extends across at least a portion of one of the plies of transparent glazing material to form a laminated glazing. The glazing may comprise at least one of a solar control or low-emission coating layer. Alternatively or additionally, the glazing may comprise an infrared reflective layer.

In the above examples, the antenna conductor used is a wire. However, other line-like electrical conductors may be used. For example, the antenna conductor and coupling region may be formed from a region printed using an electrically conductive ink (such as a silver-containing ink). This region is provided on the surface of a ply of transparent glazing material such as glass, either in a laminated structure or single ply structure, and in contact with either a layer of plastics material such as an interlayer material or a self-adhesive film. Alternatively, the printed region could be provided on the layer of plastics material. Similarly, it may be desirable to adhere a wire onto the surface of a ply of transparent glazing material. For a laminated glazing, the antenna conductor and coupling region may be in contact either with surface 2 or surface 3, and the surface contact in contact with surface 4. For a coupling region in contact with surface 2, coupling between the coupling region and the surface contact may be improved further by including another electrical conductor such as a metal plate within a laminated glazing structure between the ply interlayer material and surface 3. Preferably the electrical conductor is placed in with the coupling region and the surface contact (directly below and above).

The invention may also be used to connect dipole antennae using the same principle, where two surface contacts are used. The first surface contact is connected to the inner conductor of a coaxial cable, and the second surface contact is connected to the outer conductor of the coaxial cable.

Although the above examples involve the use of laminated glazings, it is also possible to apply the same inventive concept to so-called bi-layer glazings. A bi-layer glazing construction typically comprises a single ply of toughened or semi-toughened glass having a ply (or film) of a polymer material applied to the surface which will face into a vehicle when fitted. The film acts to improve the impact resistance properties of the single-ply of glass whilst providing a glazing construction which is lighter in weight than a laminated glazing. Again, wiring for antennae needs to be covered with a cable channel, or hidden within the obscuration band on the glazing or within the trim of the vehicle.

FIG. 16 is a schematic cross-section of a bi-layer glazing having an antenna arrangement in accordance with the present invention. The bi-layer glazing 160 comprising a ply of glass 161 having a ply of polymer material 162 adhered to one surface. An antenna 163 is provided between the ply of polymer material 162 and the ply of glass 161. One end of the antenna 163 is configured to form a coupling region 164, which acts to couple signals received by the antenna 163 and a surface contact 165 by transmission-line coupling. Again, the antenna connector portion 164 is configured to have a length equal to $\lambda_{eff}/4$ to act as a bandpass filter. The surface contact 165 is positioned above the coupling region 164, so as to be at least in partial registration. The ply of polymer material used may be a single-ply or multiple-ply film, and is preferably a self-adhesive PET (poly ethylene terephthalate) film. Suitable self-adhesive films are those that employ a pressure-sensitive adhesive, such as that sold as Spallshield™, available from Du Pont. Such films typically have a thickness in the range 100-500 μm, and an adhesive layer having a thickness in range 5-50 μm. The film may have additional solar or thermal control properties, and/or may be clear or tinted. The ply of glass used may be toughened, semi-toughened or annealed, and itself may be clear or tinted. The antenna is provided in the faun of a wire on the adhesive surface of the film, prior to placement on the ply of glass, using a wiring machine employing a head travelling on an x-y plotter. The wire has a diameter in the range 10-160 μm, and may be provided with an insulating coating. Once the antenna is in place, the film is adhered to the ply of glass, after de-airing, using rollers.

The surface contact 165 may be an area of conductive ink printed on the non-adhesive surface of the film, or may be a metal contact adhered to the surface of the film using a suitable adhesive. The surface contact 165 may be a solid region, such as a printed patch, or an open region, such as a printed mesh or grid. Depending on the configuration of the surface contact, a partial overlap or complete registration with the coupling region may be desirable. Although the antenna 163 in FIG. 16 is formed from an electrically conductive wire, it may also be formed by a printed region of electrically conductive ink, such as a silver-based ink.

Other single-ply glazings may also include antenna connectors in accordance with the present invention. For example, a single-ply of toughened glass (such as a sidelight) may be provided with an electrically conductive silver print on one surface, forming an antenna conductor having a portion configured to function as an antenna connector. A surface contact may be provided in the form of piece of plastics material having an electrically conductive material forming a coupling region on one surface, and extending across a portion of the glazing. The piece of plastics material is bonded to the glazing so as to be in contact with the silver print, with the adhesive being provided on the surface that does not have the electrically conductive material on it. Consequently transmission line coupling may take place between the surface contact and the antenna connector without the need for soldering a connector into place.

The invention claimed is:

1. An automotive glazing, comprising:
   at least a first ply of a transparent glazing material;
   a ply of a plastics material extending across the ply of glazing material and having a line-like electrical conductor in contact therewith, a portion of the electrical conductor line being configured to form an antenna conductor and a portion being configured to form a coupling region;
   a surface contact on the surface of the first ply of glazing material situated away from the plastics material, in registration with the coupling region;
   wherein the coupling region and the surface contact form a transmission line acting as a bandpass filter for a frequency band f, the portion of the electrical conductor forming the coupling region having a length approximately equal to an odd multiple of a quarter of a first effective wavelength $\lambda_{eff}$ in the glazing corresponding to f, such that signals received by the antenna in the bandwidth are transferred between the coupling region and the surface contact by low-impedance radio frequency coupling.

2. The glazing of claim 1, wherein the portion of the electrical conductor forming the coupling region is configured to have a number of turns such that adjacent conductor turns have parallel electric currents.

3. The glazing of claim 1, wherein the portion of the electrical conductor forming the coupling region has at least one reticulation.

4. The glazing of claim 3, wherein the length of the portion of the electrical conductor forming the coupling region, the number of reticulations or turns and the spacing between reticulations or turns are determined by f.

5. The glazing of claim 4, wherein the spacing between the reticulations or turns is greater than the distance at which electrical current cancelling effects occur.

6. The glazing of claim 1, wherein the portion of the electrical conductor forming the coupling region is formed into a spiral having at least one turn.

7. The glazing of claim 1, wherein an end of the electrical conductor is configured to form the coupling region.

8. The glazing of claim 1, wherein the surface contact is formed from an electrical conductor having the same configuration as the coupling region.

9. The glazing of claim 8, wherein the coupling region and the surface contact form an open ended two-line transmission line having a length approximately equal to an odd multiple of a quarter of the effective wavelength $\lambda_{eff}$ in the glazing corresponding to f.

10. The glazing of claim 1, wherein the surface contact is formed from a metal plate.

11. The glazing of claim 1, wherein the antenna is for signals in a frequency range of 0.1 MHz to 6 GHz.

12. The glazing of claim 1, wherein the glazing is a windscreen and the electrical conductor is positioned within the vision area of the windscreen, wherein the vision area is defined in accordance with ECE R43.

13. The glazing of claim 1, wherein the electrical conductor is formed from a wire embedded within the plastics material.

14. The glazing of claim 13, wherein the wire comprises at least one of copper, tungsten, gold, silver, aluminium or an alloy thereof.

15. The glazing of claim 13, wherein the wire comprises an electrically insulating coating.

16. The glazing of claim 13, wherein the wire comprises an adhesive coating.

17. The glazing of claim 13, wherein the wire has a thickness in the range of 10-500 μm.

18. The glazing of claim 1, wherein the electrical conductor is formed from a wire adhered to the ply of glazing material.

19. The glazing of claim 1, wherein the electrical conductor is a region of printed electrically conductive ink on the surface of the first ply of transparent glazing material opposite the surface contact.

20. The glazing of claim 1, wherein the electrical conductor is a region of printed electrically conductive ink on a surface of the ply of plastics material.

21. The glazing of claim 1, wherein the glazing further comprises a second ply of a transparent glazing material, and the plastic material is a layer of interlayer material, laminated between the first and second ply of glazing material.

22. The glazing of claim 21, wherein the interlayer material is polyvinyl butyral.

23. The glazing of claim 1, wherein the glazing further comprises a second ply of a transparent glazing material, and the plastic material is a layer of interlayer material, laminated between the first and second ply of glazing material, and wherein the electrical conductor contacts a major face of the second ply of transparent glazing material.

24. The glazing of claim 1, wherein the transparent glazing material is one of annealed, toughened or semi-toughened glass, or a plastics material.

25. The glazing of claim 1, wherein the coupling region and surface contact are positioned such that the electrical conductor forms at least two antennae having a single coupling region.

26. The glazing of claim 1, wherein two surface contacts are used, the first surface contact being connected to the inner conductor of a coaxial cable, and the second surface contact being connected to the outer conductor of the coaxial cable.

27. The glazing of claim 1, further comprising at least one of a solar control or low-emission coating layer.

28. The glazing of claim 1, further comprising an infrared reflective layer.

29. An automotive glazing, comprising:
- a ply of a transparent glazing material having a line-like electrical conductor in contact therewith, a portion of the electrical conductor line being configured to form an antenna conductor and a portion being configured to form a coupling region;
- a ply of a plastics material extending across at least a portion of the ply of glazing material,
- a surface contact on the surface of the plastics material away from the electrical conductor, in registration with the coupling region;

wherein the coupling region and the surface contact form a transmission line acting as a bandpass filter for a frequency band f, the portion of the electrical conductor forming the coupling region having a length approximately equal to an odd multiple of a quarter of a first effective wavelength $\lambda_{\mathit{eff}}$ in the glazing corresponding to f, such that signals received by the antenna in the bandwidth are transferred between the coupling region and the surface contact by low-impedance radio frequency coupling.

30. The glazing of claim 29, wherein the ply of transparent glazing material is a single ply of toughened silicate float glass.

31. The glazing of claim 30, wherein the plastic material is a self-adhesive impact resistant film.

* * * * *